United States Patent
Amidon et al.

(10) Patent No.: US 7,849,420 B1
(45) Date of Patent: Dec. 7, 2010

(54) INTERACTIVE CONTENT REPRESENTATIONS ENABLING CONTENT SHARING

(75) Inventors: Christopher M. Amidon, Apex, NC (US); Richard J. Walsh, Raleigh, NC (US); Alfredo C. Issa, Apex, NC (US); Kunal Kandekar, Raleigh, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 793 days.

(21) Appl. No.: 11/678,813

(22) Filed: Feb. 26, 2007

(51) Int. Cl.
*G06F 3/048* (2006.01)

(52) U.S. Cl. .................. 715/848; 715/700; 715/764

(58) Field of Classification Search .............. 715/200, 715/219, 227, 700, 764, 848; 709/219, 227
See application file for complete search history.

(56) References Cited

U.S. PATENT DOCUMENTS

| | | | |
|---|---|---|---|
| 5,736,982 A | 4/1998 | Suzuki et al. | |
| 5,923,330 A | 7/1999 | Tarlton et al. | |
| 6,256,043 B1 * | 7/2001 | Aho et al. | 345/629 |
| 6,349,301 B1 | 2/2002 | Mitchell et al. | |
| 6,453,294 B1 | 9/2002 | Dutta et al. | |
| 6,545,682 B1 | 4/2003 | Ventrella et al. | |
| 6,580,811 B2 | 6/2003 | Maurer et al. | |
| 6,629,136 B1 | 9/2003 | Naidoo | |
| 6,672,961 B1 | 1/2004 | Uzun | |
| 6,795,972 B2 | 9/2004 | Rovira | |
| 6,854,012 B1 | 2/2005 | Taylor | |
| 6,910,186 B2 | 6/2005 | Kim | |
| 6,948,131 B1 | 9/2005 | Neven et al. | |
| 7,006,098 B2 | 2/2006 | Bickmore et al. | |
| 7,034,678 B2 | 4/2006 | Burkley et al. | |

(Continued)

FOREIGN PATENT DOCUMENTS

EP  1473650 A1  3/2004

(Continued)

OTHER PUBLICATIONS

Press Releases Comverse, http://www.comverse.com/press_releases.aspx?newsId=412, Obtained May 17, 2007.

(Continued)

*Primary Examiner*—Adam L Basehoar
*Assistant Examiner*—Michael Scott
(74) *Attorney, Agent, or Firm*—Withrow & Terranova, PLLC

(57) ABSTRACT

A system and method providing interactive content representations enabling content sharing are disclosed. In general, a content representation that is descriptive of content made accessible by a hosting user is presented in association with a content representation host representing the hosting user. The content representation host may be, for example, an avatar in a virtual environment, a custom webpage of the hosting user, an identifier of the hosting user in a peer-to-peer (P2P) network, an identifier of the hosting user in a mobile network, or the like. Based on the content representation, a viewing user can determine whether content of interest is accessible from the hosting user. The viewing user may interact with the content representation to further explore the content made accessible by the hosting user and, if desired, initiate transfer of at least some of the content to a client device associated with the viewing user.

24 Claims, 17 Drawing Sheets

U.S. PATENT DOCUMENTS

| | | | |
|---|---|---|---|
| 7,036,082 B1 | 4/2006 | Dalrymple et al. | |
| 7,107,549 B2* | 9/2006 | Deaton et al. | 715/836 |
| 7,197,126 B2 | 3/2007 | Kanada | |
| 7,248,677 B2 | 7/2007 | Randall et al. | |
| 7,396,281 B2 | 7/2008 | Mendelsohn et al. | |
| 7,599,983 B2 | 10/2009 | Harper et al. | |
| 7,614,016 B2* | 11/2009 | Wong et al. | 715/854 |
| 2001/0021920 A1* | 9/2001 | Ikeda | 705/26 |
| 2002/0033848 A1 | 3/2002 | Sciammarella et al. | |
| 2002/0072922 A1 | 6/2002 | Suzuki et al. | |
| 2002/0085031 A1 | 7/2002 | Conrado et al. | |
| 2002/0113820 A1 | 8/2002 | Robinson et al. | |
| 2002/0151327 A1* | 10/2002 | Levitt | 455/556 |
| 2002/0156875 A1 | 10/2002 | Pabla | |
| 2003/0005439 A1 | 1/2003 | Rovira | |
| 2003/0028451 A1* | 2/2003 | Ananian | 705/27 |
| 2003/0051255 A1 | 3/2003 | Bulman et al. | |
| 2003/0079177 A1 | 4/2003 | Brintzenhofe et al. | |
| 2003/0174178 A1 | 9/2003 | Hodges | |
| 2004/0015562 A1 | 1/2004 | Harper et al. | |
| 2004/0078432 A1 | 4/2004 | Manber et al. | |
| 2004/0125136 A1 | 7/2004 | Wallenios | |
| 2004/0179039 A1 | 9/2004 | Blattner et al. | |
| 2004/0189701 A1 | 9/2004 | Badt, Jr. | |
| 2004/0193673 A1* | 9/2004 | Samji et al. | 709/200 |
| 2004/0199867 A1 | 10/2004 | Brandenborg | |
| 2004/0239681 A1 | 12/2004 | Robotham et al. | |
| 2004/0240652 A1 | 12/2004 | Kanada | |
| 2005/0010637 A1* | 1/2005 | Dempski et al. | 709/204 |
| 2005/0060746 A1 | 3/2005 | Kim | |
| 2005/0137015 A1 | 6/2005 | Rogers et al. | |
| 2005/0198353 A1 | 9/2005 | Zmrzli | |
| 2005/0210387 A1 | 9/2005 | Alagappan et al. | |
| 2005/0264647 A1 | 12/2005 | Rzeszewski et al. | |
| 2006/0064645 A1 | 3/2006 | Neven et al. | |
| 2006/0111188 A1 | 5/2006 | Winkler | |
| 2006/0148512 A1 | 7/2006 | Ekholm et al. | |
| 2006/0161635 A1* | 7/2006 | Lamkin et al. | 709/217 |
| 2006/0184579 A1 | 8/2006 | Mills et al. | |
| 2006/0195515 A1* | 8/2006 | Beaupre et al. | 709/203 |
| 2006/0235790 A1 | 10/2006 | Jung et al. | |
| 2006/0242234 A1 | 10/2006 | Counts et al. | |
| 2006/0271997 A1 | 11/2006 | Jacoby et al. | |
| 2006/0277474 A1 | 12/2006 | Robarts et al. | |
| 2006/0282391 A1* | 12/2006 | Peterka et al. | 705/57 |
| 2007/0013701 A1* | 1/2007 | Segawa et al. | 345/502 |
| 2007/0094691 A1 | 4/2007 | Gazdzinski | |
| 2007/0127889 A1 | 6/2007 | Seo | |
| 2007/0184855 A1 | 8/2007 | Klassen et al. | |
| 2007/0198364 A1* | 8/2007 | Quoc et al. | 705/26 |
| 2007/0223675 A1* | 9/2007 | Surin et al. | 379/202.01 |
| 2007/0287498 A1 | 12/2007 | Wang et al. | |
| 2007/0288470 A1* | 12/2007 | Kauniskangas et al. | 707/10 |
| 2007/0299737 A1* | 12/2007 | Plastina et al. | 705/26 |
| 2008/0052242 A1 | 2/2008 | Merritt et al. | |
| 2008/0059422 A1* | 3/2008 | Tenni et al. | 707/3 |
| 2008/0091521 A1 | 4/2008 | Ho et al. | |
| 2008/0104114 A1* | 5/2008 | Kasperkiewicz et al. | 707/104.1 |
| 2008/0201638 A1 | 8/2008 | Nair | |
| 2008/0222295 A1 | 9/2008 | Robinson et al. | |
| 2008/0257134 A1* | 10/2008 | Oppenheimer | 84/609 |
| 2009/0031006 A1 | 1/2009 | Johnson | |
| 2009/0037822 A1 | 2/2009 | Kandekar et al. | |
| 2009/0119614 A1* | 5/2009 | Tienvieri et al. | 715/786 |
| 2010/0131584 A1 | 5/2010 | Johnson | |

FOREIGN PATENT DOCUMENTS

| | | |
|---|---|---|
| EP | 1689143 A1 | 10/2004 |
| WO | WO 02/21831 A2 | 3/2002 |
| WO | WO 2004/036902 A1 | 4/2004 |
| WO | WO 2005/020129 A2 | 3/2005 |
| WO | WO 2006/036207 A1 | 4/2006 |

OTHER PUBLICATIONS

Personalise Skype—Invent Yourself, http://skype.klonies.com/studio.php, Obtained May 17, 2007.

Gravatar—Globally Recognized Avatars, http://site.gravatar.com/, main page only, Obtained May 17, 2007.

Cyworld, http://us.cyworld.com/main/index.php, Obtained May 17, 2007.

Youniversal Branding, http://www.trendwatching.com/trends/YOUNIVERSALBRANDING.htm, Obtained May 17, 2007.

Avatars—Yahoo! Messenger, http://messenger.yahoo.com/avatars.php, Obtained May 17, 2007.

Luskwood Creatures, http://www.luskwood.com/index.htm, Obtained May 17, 2007.

Meez—Avatars for MySpace, Xanga and IM, http://mashable.com/2006/08/22/meez-avatars-for-myspace-xanga-and-im/, main page only, obtained May 17, 2007.

MySpace, http://www.myspace.com, main page only, obtained May 31, 2007.

Rana El Kaliouby and Peter Robinson, "FAIM: Integrating Automated Facial Affect Analysis in Instant Messaging," In Proceedings of ACM International Conference on Intelligent User Interfaces (IUI), pp. 244-246, 2004.

Pandora Radio, http://www.pandora.com, main page only, obtained May 31, 2007.

Rhapsody—Free access to millions of songs online, http://www.rhapsody.com/home.html, obtained May 31, 2007.

Smith, Steve; "Tapping the Feed: in search of an RSS Money Trail" Econtent; Mar. 2005; vol. 28, Issue 3; p. 30-34.

Krol, Carol; "RSS ad programs feed needs" B to B; Jul. 11, 2005; vol. 90 Issue 9; p. 1-33.

* cited by examiner

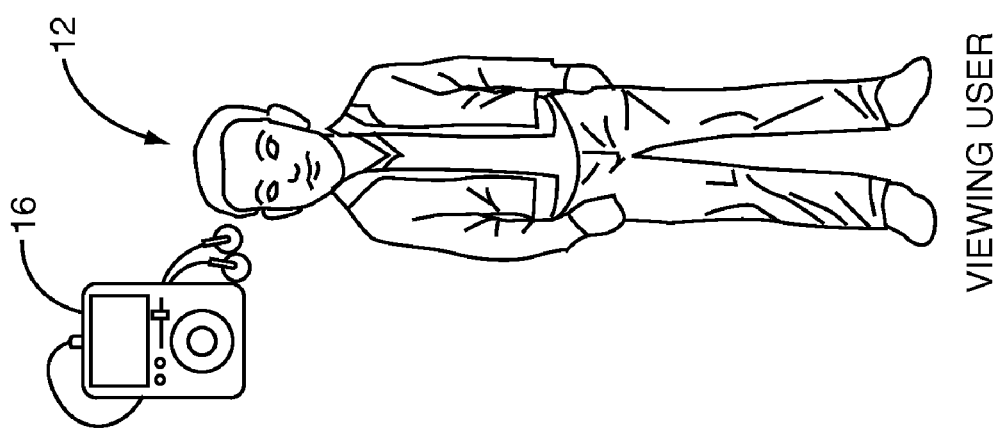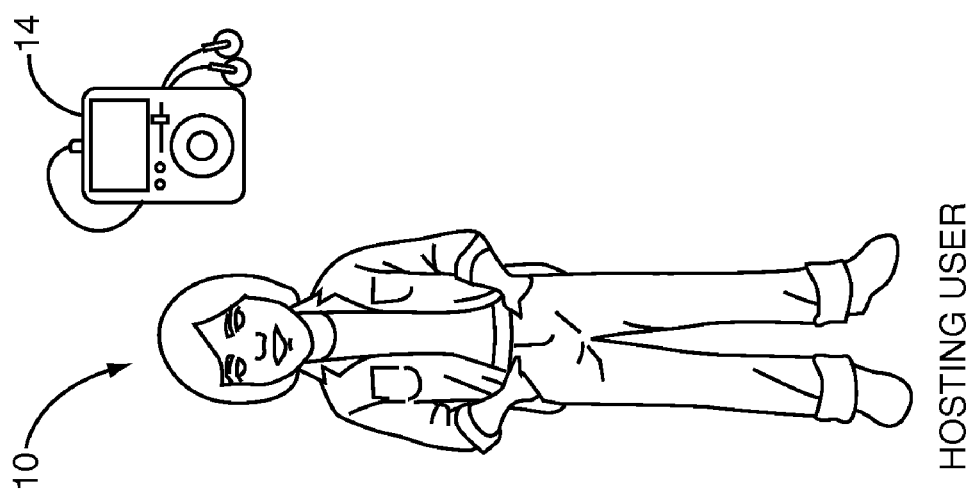
FIG. 1A

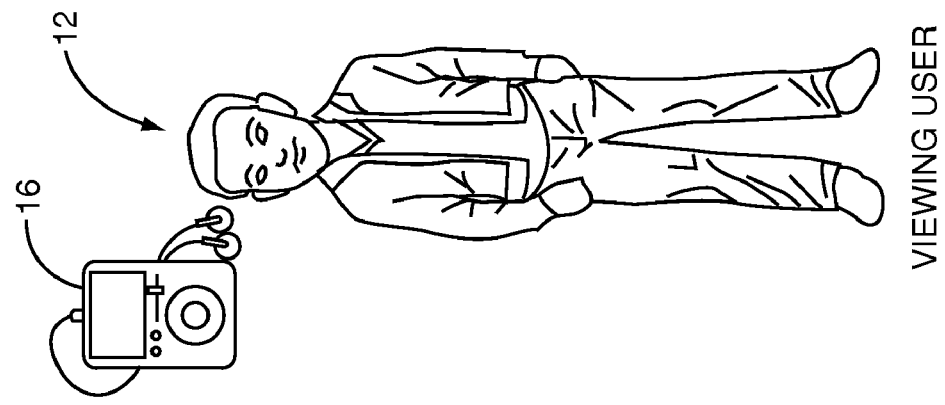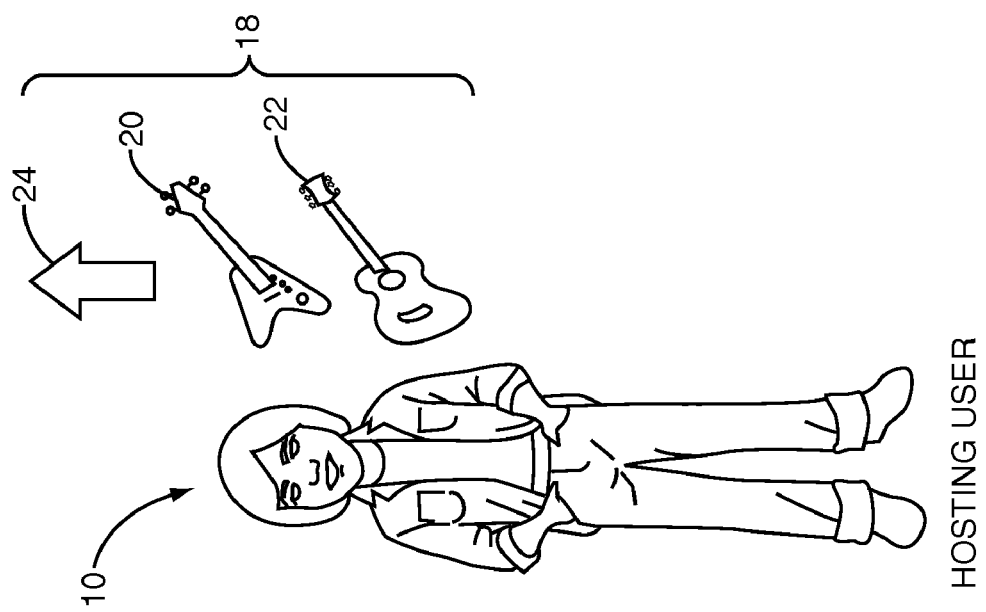
FIG. 1B

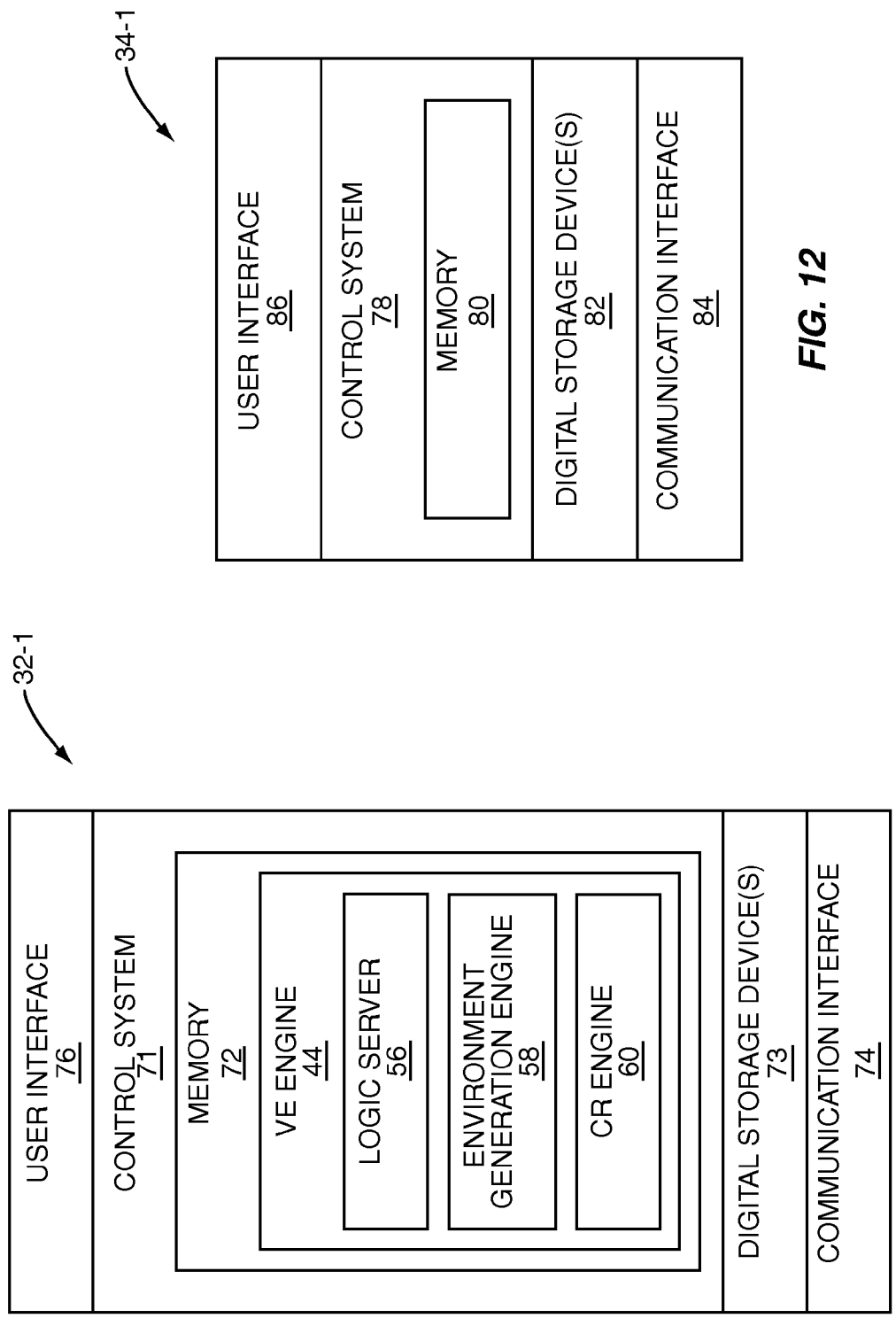

INTERACTIVE CONTENT REPRESENTATIONS ENABLING CONTENT SHARING

FIELD OF THE INVENTION

The present invention relates to a system and method enabling content sharing by interacting with content representations presented in association with a host.

BACKGROUND OF THE INVENTION

There are many environments where users interact with each other and, as part of the interaction, share content. These environments include, for example, gaming, virtual worlds, online content sharing or social networking sites, and the like. One issue with these environments is that shared content is not portrayed in a way that is intuitive for content sharing. Users must often dive deep into content folders or user profiles only to discover that the content is of no interest. Thus, there is a need for a system and method for representing content shared or otherwise made available in such environments in a manner that enables users to intuitively identify other users having content of interest.

SUMMARY OF THE INVENTION

The present invention relates to interactive content representations enabling content sharing. In general, a content representation that is descriptive of content made accessible by a hosting user is presented in association with a content representation host representing the hosting user. The content representation host may be, for example, an avatar in a virtual environment, a custom webpage of the hosting user, an identifier of the hosting user in a peer-to-peer (P2P) network, an identifier of the hosting user in a mobile network, or the like. Based on the content representation, a viewing user is able to quickly and easily determine whether content of interest is accessible from the hosting user. If so, the viewing user may interact with the content representation to further explore the content made accessible by the hosting user and, if desired, initiate transfer of at least some of the content to a client device associated with the viewing user.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIGS. 1A-1D illustrate an exemplary process for identifying content of interest and initiating content sharing based on interactions with content representations according to one embodiment of the present invention;

FIG. 11 is a block diagram of an exemplary embodiment of one of the virtual environment servers of FIG. 2 according to one embodiment of the present invention;

FIG. 12 is a block diagram of an exemplary embodiment of one of the client devices of FIG. 2 according to one embodiment of the present invention;

DETAILED DESCRIPTION OF THE PREFERRED EMBODIMENTS

Figure 1C:
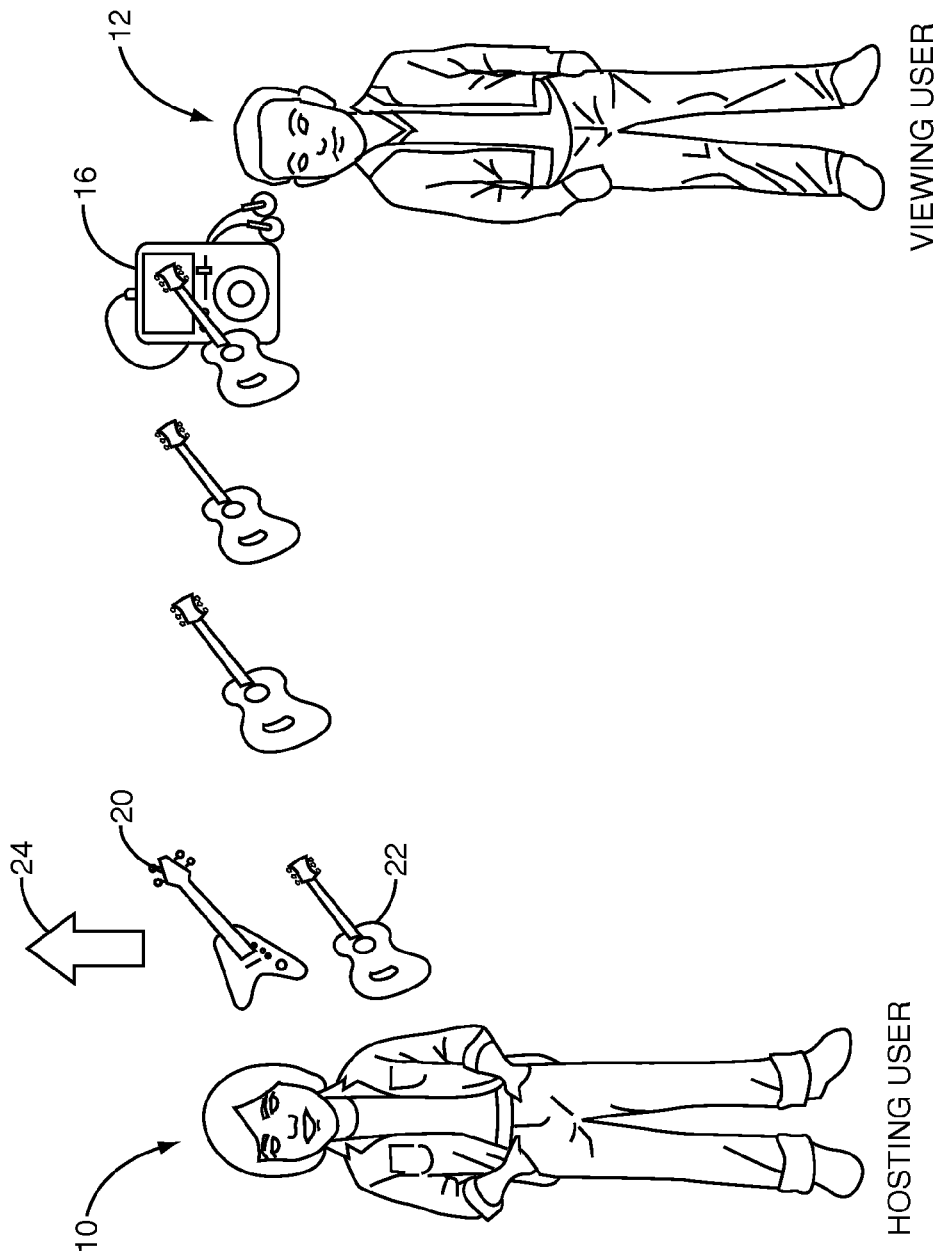

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to interactive content representations enabling content sharing. In general, a content representation that is descriptive of content shared or otherwise made accessible by a hosting user is presented in association with a content representation host representing the hosting user. The content representation host may be, for example, an avatar in a virtual environment, a custom webpage of the hosting user, an identifier of the hosting user in a peer-to-peer (P2P) network, an identifier of the hosting user in a mobile network, or the like. Based on the content representation, a viewing user is able to quickly and easily determine whether content of interest is accessible from the hosting user. If so, the viewing user may interact with the content representation to further explore the content made accessible by the hosting user and, if desired, initiate transfer of at least some of the content to a client device associated with the viewing user.

In one embodiment, the content representation host is an avatar representing the hosting user in a virtual environment. The virtual environment may be, for example, a virtual world such as SECOND LIFE™ or a virtual gaming environment such as a Massively Multiplayer Online Role Playing Game (MMORPG). In order to enable a viewing user to determine whether content of interest is made accessible by the hosting user, one or more content representations descriptive of the content is presented in association with the avatar of the hosting user in the virtual environment. Each content representation may be implemented as a visual element or graphic presented alongside the avatar of the hosting user, or implemented as a modification to the appearance of the avatar of the hosting user. If desired, the viewing user may interact with the one or more content representations to navigate through a navigation tree of the hosting user to further explore the content made accessible by the hosting user. In one embodiment, the navigation tree is a tree of content representations that describes the content made accessible by the hosting user more generally as the viewing user navigates up the navigation tree and more specifically as the viewing user navigates down the navigation tree. However, the present invention is not limited thereto. The navigation tree may be any logical structure of content representations enabling a viewing user to browse content representations that are describing the content made accessible by the hosting user. The viewing user may further interact with the content representations to initiate transfer of content of interest to a client device of the viewing user.

FIGS. 1A-1D provide an overview of one embodiment of the present invention. FIG. 1A illustrates avatars 10 and 12 representing a hosting user and a viewing user, respectively, in a virtual environment. An avatar is a representation of a user in the form of a three-dimensional model, a two-dimensional icon, or the like. A content representation 14 is presented in association with the avatar 10 in a view of the virtual environment provided to the viewing user, where the content representation 14 is descriptive of content made accessible by the hosting user. Note that while the content representation is presented alongside the avatar 10, the present invention is not limited thereto. The content representation may be presented anywhere in the view of the virtual environment presented to the viewing user or in a separate window. The content may be audio content such as songs, video content such as movies or television programs, pictures, or the like. In this example, the content representation 14 is a graphic of a portable media player, which indicates that audio content, such as songs, is made accessible by the hosting user. Note that while the content representation 14 is a graphic presented alongside the avatar 10 in this embodiment, the content representation 14 may alternatively be presented, for example, as modifications to the hairstyle, clothing, or accessories of the avatar 10. For more information regarding content representations, the interested reader is directed to U.S. patent application Ser. No. 11/678,781, entitled SYSTEM AND METHOD FOR REPRESENTING CONTENT, filed on Feb. 26, 2007, which is hereby incorporated herein by reference in its entirety.

Likewise, a content representation 16 is presented in association with the avatar 12 of the viewing user in a view of the virtual environment presented to the hosting user where the content representation 16 is descriptive of content made accessible by the viewing user. In this example, the content representation 16 is a graphic of a portable media player, which indicates that audio content is made accessible by the viewing user.

FIG. 1B illustrates a scenario where the viewing user interacts with the content representation 14 (FIG. 1A) by, for example, clicking on the content representation 14 in order to further explore a navigation tree describing the content made accessible by the hosting user. In this example, in response to the interacting with the content representation 14 (FIG. 1A), the viewing user proceeds down the navigation tree to an adjacent level 18 of the navigation tree such that content representations 20 and 22 are presented to the viewing user in association with the avatar 10 of the hosting user. The content representation 20 is a Rock content representation indicating that music from the Rock genre is made accessible by the hosting user. Likewise, the content representation 22 is a Country content representation indicating that music from the Country genre is made accessible by the hosting user. The viewing user may, if desired, interact or select one of the content representations 20 or 22 to proceed further down the navigation tree in order to view content representations that are more specifically descriptive of the content made accessible by the hosting user. In addition, in this example, a navigation element 24 is presented to enable the viewing user to go up the navigation tree to return to the content representation 14 (FIG. 1A). By traversing the navigation tree, the viewing user is enabled to explore a number of content representations that are more generally or specifically descriptive of the content made accessible by the hosting user.

FIG. 1C illustrates a scenario where the viewing user interacts with the content representation 22 to initiate transfer of at least a portion of the content represented by or related to the content representation 22 to a client device associated with the viewing user. In this example, the viewing user initiates the content transfer by dragging and dropping the content representation 22 to the content representation 16 presented in association with the avatar 12 of the viewing user. While in one embodiment all of the content items represented by the content representation 22 may be transferred to the client device of the viewing user, a recommendation engine preferably selects content items from the group of content items represented by the content representation 22 based on, for example, user preferences of the viewing user, content made accessible by the viewing user, a navigation history of the viewing user, past activities of the viewing user, a play history of the viewing user, or the like or any combination thereof. The selected content items are then transferred to the client device associated with the viewing user via a content sharing function.

While the example of FIG. 1C illustrates an embodiment where the viewing user initiates the content transfer by dragging and dropping the content representation 22 to the content representation 16, the present invention is not limited thereto. For example, the viewing user may alternatively initiate the content transfer by double-clicking on the content representation 22, by right-clicking on the content representation 22, or the like. Further, the viewing user may be enabled to select a location to which the desired content is to be transferred and stored.

Figure 1D:
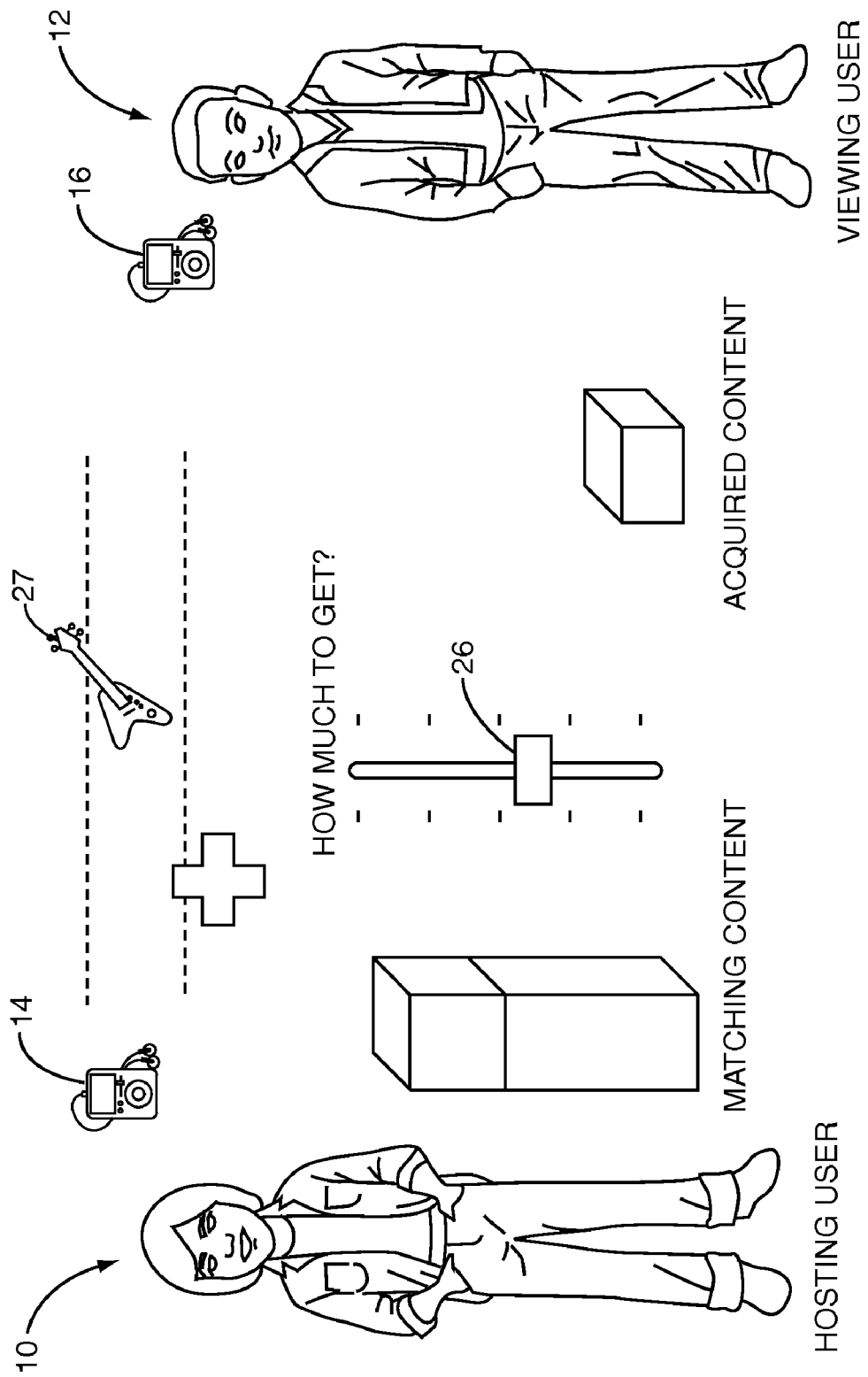

FIG. 1D illustrates an exemplary view of the virtual environment provided during content transfer. Note that an element 26 may be provided to enable the viewing user to adjust a confidence factor of the recommendation engine used to select content items to transfer to the client device associated with the viewing user. By adjusting the confidence factor, the viewing user is able to control the number of content items transferred to the client device of the viewing user. Note that the confidence factor is exemplary. As will be apparent to one of ordinary skill in the art, other additional or alternative variables may be controlled by the viewing user to control the content transfer.

Further, a content representation 27 is presented as a status indicator for the content transfer. The viewing user may interact with the content representation 27 in a manner similar to that described above in order to, for example, navigate through a number of content representations that are more generally or more specifically descriptive of the content transfer. For example, the content representation 27 is a Rock content representation, thereby indicating that content from the Rock genre is being transferred. The viewing user may interact with the content representation 27 to navigate to one or more content representations that are more specifically descriptive of the content being transferred. For example, if content by the Rock group AC/DC is being transferred, the viewing user may interact with the content representation 27 such that a content representation indicative of AC/DC is presented. The viewing user may further interact with the content representation 27 in order to, for example, stop the content transfer, stop the transfer of specific content, pause the content transfer, or the like.

Figure 2:
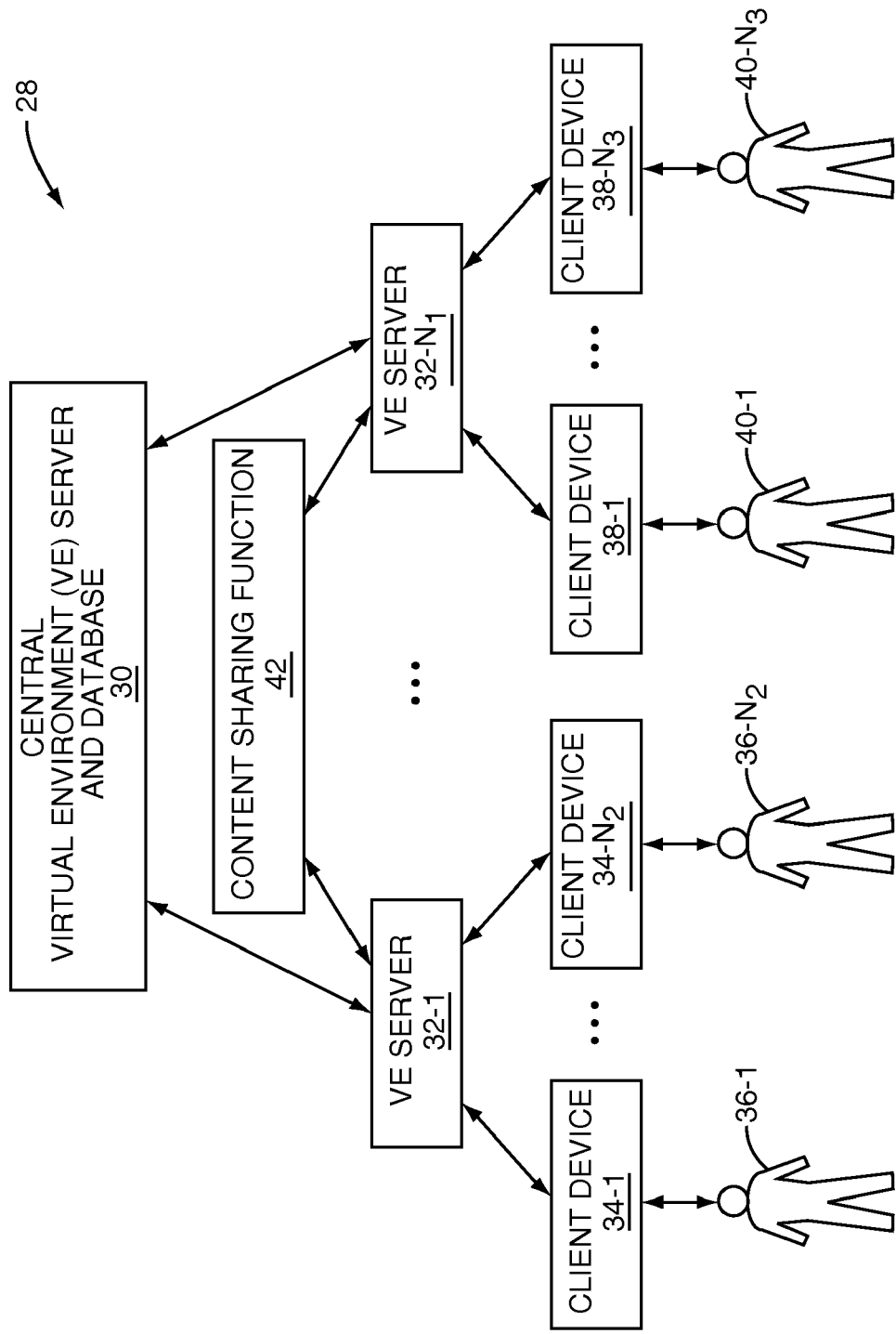
FIG. 2 illustrates an exemplary embodiment of a system providing content representations in a virtual environment and enabling content sharing by interacting with the content representations according to one embodiment of the present invention.

FIG. 2 illustrates an exemplary embodiment of a system 28 providing a virtual environment in which content representations are implemented according to one embodiment of the present invention. It should be noted that the system 28 of FIG. 2 is exemplary and is not intended to limit the scope of the present invention. Again, the virtual environment may be a virtual world such as, for example, SECOND LIFE™ or a virtual gaming environment such as an MMPORG.

In general, the system 28 includes a central virtual environment (VE) server and database 30 and a number of distributed VE servers 32-1 through 32-$N_1$. The VE server 32-1 serves a number of client devices 34-1 through 34-$N_2$ having associated users 36-1 through 36-$N_2$. Likewise, the VE server 32-$N_1$ serves a number of client devices 38-1 through 38-$N_3$ having associated users 40-1 through 40-$N_3$. The central VE server and database 30 manages user accounts and may also manage overall game logic and the like. The VE servers 32-1 through 32-$N_1$ manage interactions and user events and provide a client-specific view of the virtual environment to the client devices 34-1 through 34-$N_2$ and 38-1 through 38-$N_3$. The client devices 34-1 through 34-$N_2$ and 38-1 through 38-$N_3$ may be, for example, personal computers, mobile devices such as mobile telephones or Personal Digital Assistants (PDAs), game consoles, or the like and generally include either a custom software application or a web browser enabling interaction with the VE servers 32-1 through 32-$N_1$ for participation in the virtual environment.

Note that in an alternative embodiment, the operation of the central VE server and database 30 and optionally the VE servers 32-1 through 32-$N_1$ may be distributed among the other devices in the system 28. For example, the operation of the central VE server and database 30 may be distributed among the VE servers 32-1 through 32-$N_1$. As another example, the operation of the central VE server and database 30 and the VE servers 32-1 through 32-$N_1$ may be distributed among the client devices 34-1 through 34-$N_2$ and 38-1 through 38-$N_3$.

According to one embodiment of the present invention, the users 36-1 through 36-$N_2$ and 40-1 through 40-$N_3$ are represented by avatars in the virtual environment. Further, in order to enable, for example, the user 36-1 to locate others of the users 36-2 through 36-$N_2$ and 40-1 through 40-$N_3$ that are sharing or otherwise making accessible content of interest to the user 36-1, the system 28 effects presentation of content representations in association with the avatars of the users 36-1 through 36-$N_2$ and 40-1 through 40-$N_3$. The avatars are more generally referred to herein as content representation hosts. In addition or alternatively, content representations may be associated with other virtual objects in the virtual environment such as storefronts in the virtual environment, a virtual stereo of a user in the virtual environment, or the like, where the virtual objects may provide access to shared or otherwise available content.

The content representations are descriptive of content shared or otherwise made accessible by the users 36-1 through 36-$N_2$ and 40-1 through 40-$N_3$ from the client devices 34-1 through 34-$N_2$ and 38-1 through 38-$N_3$. The content may be audio content such as songs or music; video content such as movies, television programs, or video clips; pictures; or the like. While this disclosure focuses on the aforementioned types of content, the present invention is not limited thereto. The content may additionally or alternatively be any other type of digital content such as, for example, user profiles, activities or interaction events in the virtual environment, hobbies, or the like.

The content representations may be indicative of, for example, content types such as music, video, picture, or the like; genres such as music genres, movie genres, or television program genres; artists such as music artists, actors, or actresses; time periods; acoustic styles; keywords; or the like. In addition, the content representations may be indicative of content quality, quantity of content, availability or accessibility, copyright or Digital Rights Management (DRM) restrictions, or the like or any combination thereof.

Note that the content made accessible by the users 36-1 through 36-$N_2$ and 40-1 through 40-$N_3$ is generally hosted by the client devices 34-1 through 34-$N_2$ and 38-1 through 38-$N_3$. However, the content may alternatively be hosted by, for example, the central VE server and database 30, one or more of the VE servers 32-1 through 32-$N_1$, a third party server such as a server providing a centrally hosted content sharing service, a P2P content sharing service, or the like or any combination thereof.

In addition, the system includes a content sharing function 42 which may be implemented in software, hardware, or a combination of software and hardware. In one embodiment, the content sharing function 42 is hosted by a third-party server. Alternatively, the content sharing function 42 may be hosted by the central VE server and database 30 or one or more of the VE servers 32-1 through 32-$N_1$. In either of these situations, associated client functions may be incorporated into the client devices 34-1 through 34-$N_2$ and 38-1 through 38-$N_3$ to enable content sharing. As another alternative, the content sharing function 42 may be distributed among the client devices 34-1 through 34-$N_2$ and 38-1 through 38-$N_3$. As discussed below, the content sharing function 42 operates to effect transfer of content items from one device to another as directed by the VE servers 32-1 through 32-$N_1$.

Figure 3:
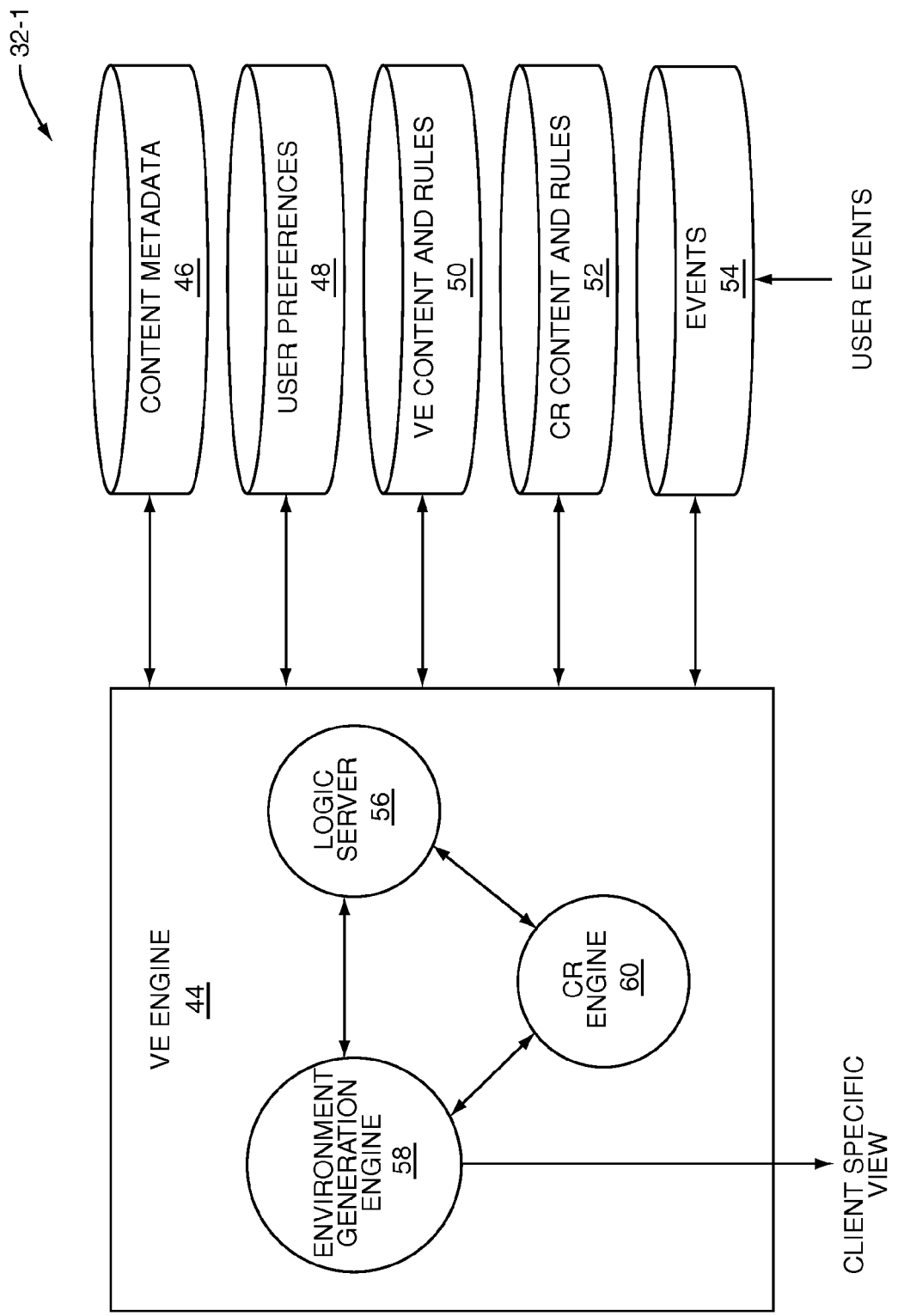
FIG. 3 illustrates one of the virtual environment servers of FIG. 2 including a content representation engine according to one embodiment of the present invention.

FIG. 3 illustrates the VE server 32-1 of FIG. 2 according to one embodiment of the present invention. As illustrated, the VE server 32-1 includes a VE engine 44 and a number of databases 46-54. The databases 46-54 include a content metadata database 46, a user preferences database 48, a VE content and rules database 50, a content representation (CR) content and rules database 52, and an events database 54. In this embodiment, the content metadata database 46 includes content metadata describing content items shared by or otherwise made accessible by each of the users 36-1 through 36-$N_2$ and 40-1 through 40-$N_3$. As used herein, a "content item" is a song, movie, television program, video clip, picture, or the like. The content metadata may vary depending on the type of content item. For example, for each song, the content metadata may include the title of the song, the album on which the song was released, the artist of the song, the release date of the song, genre or classification, information defining the quality of the song such as the encoding parameters used to encode the song, and DRM or copyright restrictions. In addition, the content metadata may include availability or accessibility information such as information reflecting a connection speed of the associated client device hosting the song, estimated download time, a reference or Uniform Resource Locator (URL) providing access to the associated content, or the like.

The user preferences database 48 stores user preferences for each of the users 36-1 through 36-N$_2$ and 40-1 through 40-N$_3$. The user preferences may include, for example, one or more preferred types of content; one or more preferred genres such as one or more preferred music genres, movie genres, or television program genres; one or more preferred time periods; one or more other classifications of content; one or more preferred artists such as one or more preferred music artists, actors, or actresses; one or more preferred acoustic styles; a preferred quality level or preferred range of quality levels; one or more preferred availability or accessibility parameters such as a preferred connection speed or estimated download time; a preferred quantity of content to be available from a host before a corresponding content representation is presented to the user; and preferred DRM or copyright restriction parameters.

In addition, the user preferences may include user preferences for configuring the system 28 related to content discovery and transfer. More specifically, the user preferences may include a navigation preference for the user, where the navigation preference defines how the user desires to navigate through content representations describing content made accessible by a hosting user. For example, when the user is a viewing user, the user may desire that the navigation tree for the hosting user be formed according to genres and sub-genres, time periods, acoustic styles, or the like or any combination thereof.

The user preferences may also include interaction configuration parameters such as locations where content transferred to the user's client device are to be stored, version(s) of content that are to be transferred to the user's client device, content transfer parameters, and buddy preferences. The version of content to be obtained may vary depending on content type, encoding algorithm, encoding parameters such as bit rate, size, DRM restrictions, aspect ratio, quality, or the like. For a song, the version may be, for example, the full version of the song or a preview of the song. For a picture, the version may be, for example, a thumbnail version, a screennail version, or the full version of the picture. Note that different versions may desired for different groups of content within a content type. For example, the user may desire to obtain the full version of songs from the Country genre but only previews of songs from the Rock genre. The content transfer parameters may define whether content transfers are to be performed depth-first, breadth-first, or randomly and how many items to obtain from each node in a hosting user's navigation tree. The buddy preferences define how the user would like to receive content obtained for the user by a "buddy" of the user. For example, the user may desire that the "buddy" gather metadata only, playlists, desired versions of content items, or the like and optionally that the "buddy" obtain authorization from the user before obtaining content for the user.

As for the databases 50 and 52, the VE content and rules database 50 stores content and rules required for the operation of the virtual environment. The CR content and rules database 52 stores graphics or information corresponding to the content representations and associated rules defining when the content representations are applicable. As discussed below, in one embodiment, the CR content and rules database 52 is an ontology where each node in the ontology is a content descriptor and is associated with one or more content representations and one or more rules. The ontology, including the nodes of the ontology, the content representations associated with the nodes of the ontology, and the rules for the nodes of the ontology, may be defined by an operator of the system 28, based on contributions from the users 36-1 through 36-N$_2$ and 40-1 through 40-N$_3$, or the like or any combination thereof. Note that while an ontology is discussed herein, any similar data structure such as a linked list, taxonomy, or the like may be used.

The events database 54 stores incoming user events from the client devices 34-1 through 34-N$_2$ and 38-1 through 38-N$_3$. The user events may be any user event permitted in the virtual environment. For example, the user event may be related to movement of the user's avatar within the virtual environment or entry of the avatar into the virtual environment, interaction with a content representation, initiation of a content transfer, configuration of a content transfer, or the like.

The VE engine 44 may be implemented in software, hardware, or a combination thereof. In general, the VE engine 44 operates to provide a client-specific view of the virtual environment to each of the client devices 34-1 through 34-N$_2$ and 38-1 through 38-N$_3$ based on user events received from the client devices 34-1 through 34-N$_2$ and 38-1 through 38-N$_3$. The VE engine 44 includes a logic server 56, an environment generation engine 58, and a content representation (CR) engine 60. Using the VE content and rules database 50, the logic server 56 and the environment generation engine 58 operate to process user events from the client devices 34-1 through 34-N$_2$ and 38-1 through 38-N$_3$ and provide client-specific views of the virtual environment to the client devices 34-1 through 34-N$_2$ and 38-1 through 38-N$_3$. The CR engine 60 interacts with the logic server 56 and the environment generation engine 58 to effect presentation of content representations within the virtual environment according to the present invention, respond to user interactions with content representations, and effect content transfers via the content sharing function 42 (FIG. 2).

Figure 4A:
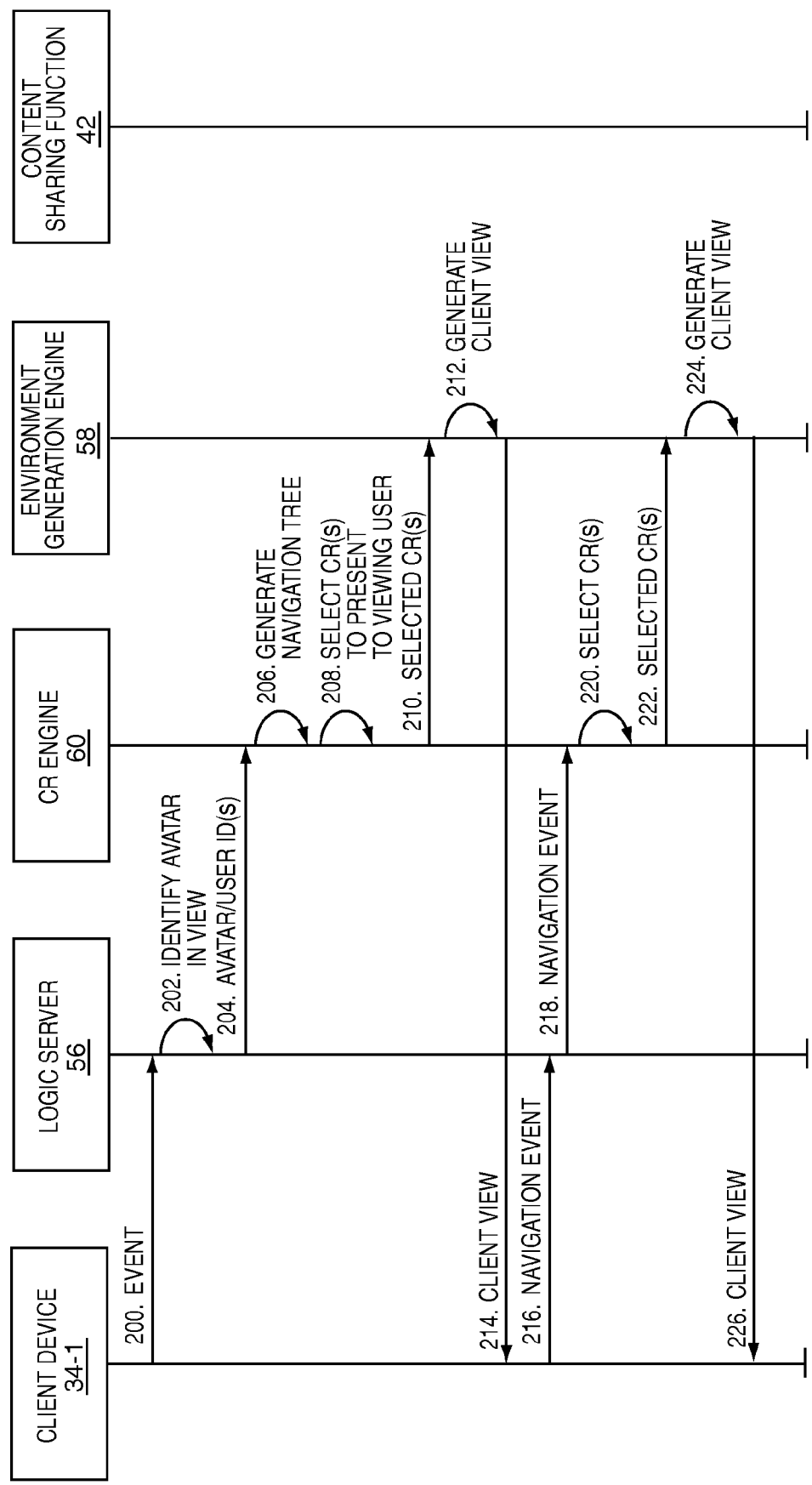
FIGS. 4A and 4B illustrate the operation of the system of FIG. 2 according to one embodiment of the present invention.
Figure 4B:
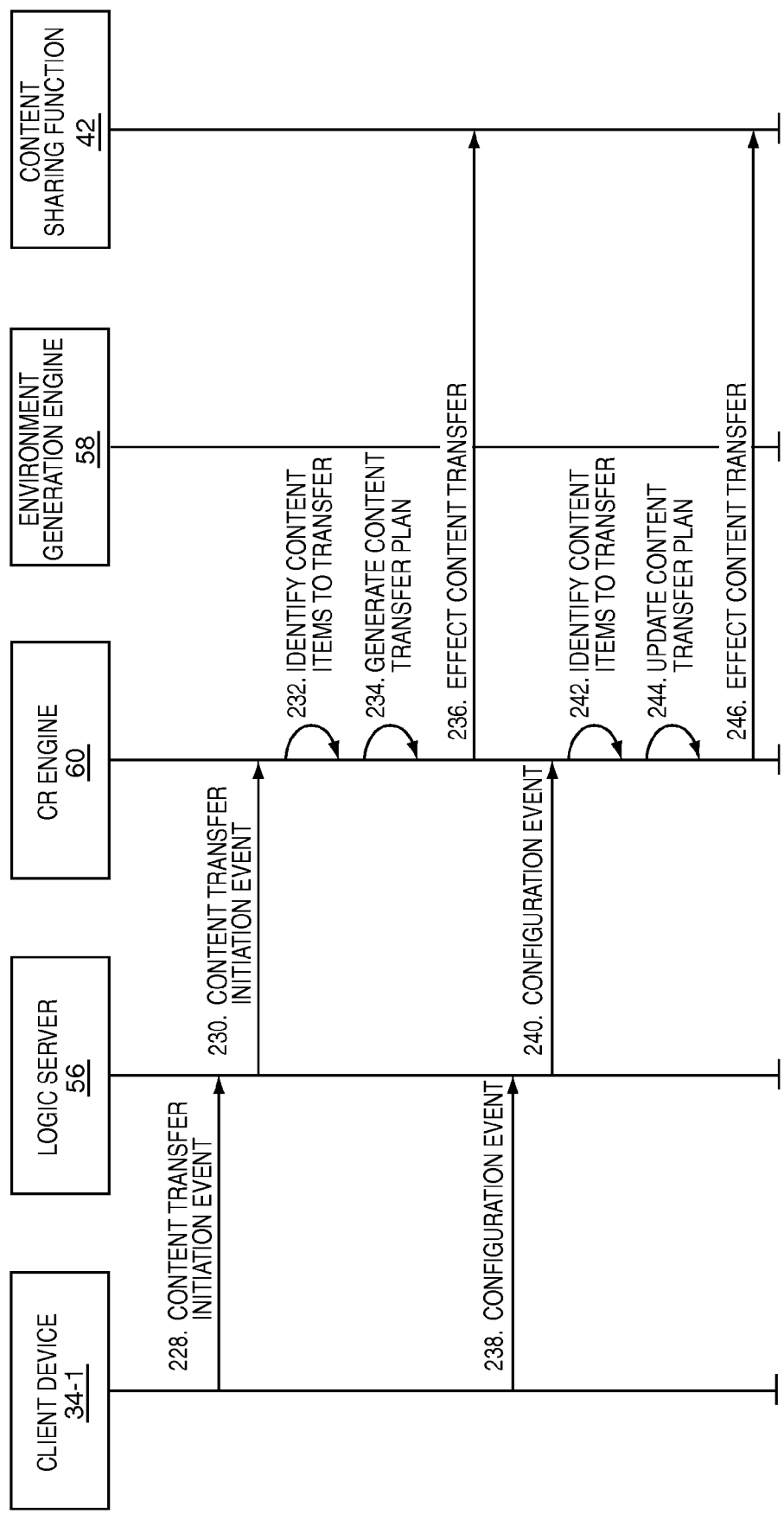

FIGS. 4A and 4B illustrate the operation of the system 28 of FIG. 2 according to one embodiment of the present invention. First, the logic server 56 receives a user event from the client device 34-1 (step 200). For this example, assume that the user event relates to movement of the avatar of the user 36-1 in the virtual environment. Upon receiving the user event, the logic server 56 identifies an avatar of one of the other users 36-2 through 36-N$_2$ and 40-1 through 40-N$_3$ that is within the view of the user 36-1 in the virtual environment (step 202). For this example, assume that only the avatar of the user 40-1 is within the view of the user 36-1. Note that while only one avatar within the view of the user 36-1 is discussed in this example, any number of avatars may be within the view of the user 36-1. Also note that the user 36-1 is also referred to herein as the "viewing user" and that the user 40-1 is also referred to herein as the "hosting user." The logic server 56 then provides information identifying the viewing user 36-1 and the hosting user 40-1 to the CR engine 60 (step 204).

At this point, the CR engine 60 generates a navigation tree for the hosting user 40-1 (step 206). The navigation tree is a tree of content representations that is descriptive of the content shared or otherwise made accessible by the hosting user 40-1. In one embodiment, the navigation tree is a tree of content representations that describes the content made accessible by the hosting user more generally as the viewing user navigates up the navigation tree and more specifically as the viewing user navigates down the navigation tree. For example, a first level of the navigation tree may include a content representation indicative of a content type such as audio; a second level of the navigation tree may be content representations indicative of genres or other classifications of the content, where each content representation in the second level is related to the content representation of the content representation in the first level; and a third level of the navigation tree may be content representations indicative of artists, where each content representation in the third level is related to one or more of the content representations in the second level. While this example has three levels, the navigation tree may have any number of levels.

Again, while the navigation tree is generally discussed herein as being a tree-like structure, the present invention is not limited thereto. The navigation tree may be any type of logical structure enabling navigation of content representations that are descriptive of content made accessible by a hosting user. For example, the navigation tree may correspond to an ontology or a portion of an ontology based on semantic relationships.

In one embodiment, in order to generate the navigation tree, the CR engine 60 first identifies one or more applicable content representations for the content made accessible by the hosting user 40-1 from a defined set of content representations stored in the CR content and rules database 52. More specifically, the CR engine 60 first processes the content metadata describing the content made available by the user 40-1 based on the CR rules from the CR content and rules database 52 to determine which content representations are applicable to the content made available by the user 40-1. The CR content and rules database 52 may include an ontology providing a defined set of content representations. Each node in the ontology corresponds to a content descriptor such as, for example, a content type, genre, artist, time period, or the like. Each node has one or more associated content representations and one or more rules defining when the content representation(s) for the node are applicable. By comparing the content metadata to the rules, the CR engine 60 determines which nodes of the ontology and thus which content representations are applicable to the content made available by the hosting user 40-1. Again, while an ontology is discussed herein, any similar data structure such as a linked list, taxonomy, or the like may be used.

Figure 5:
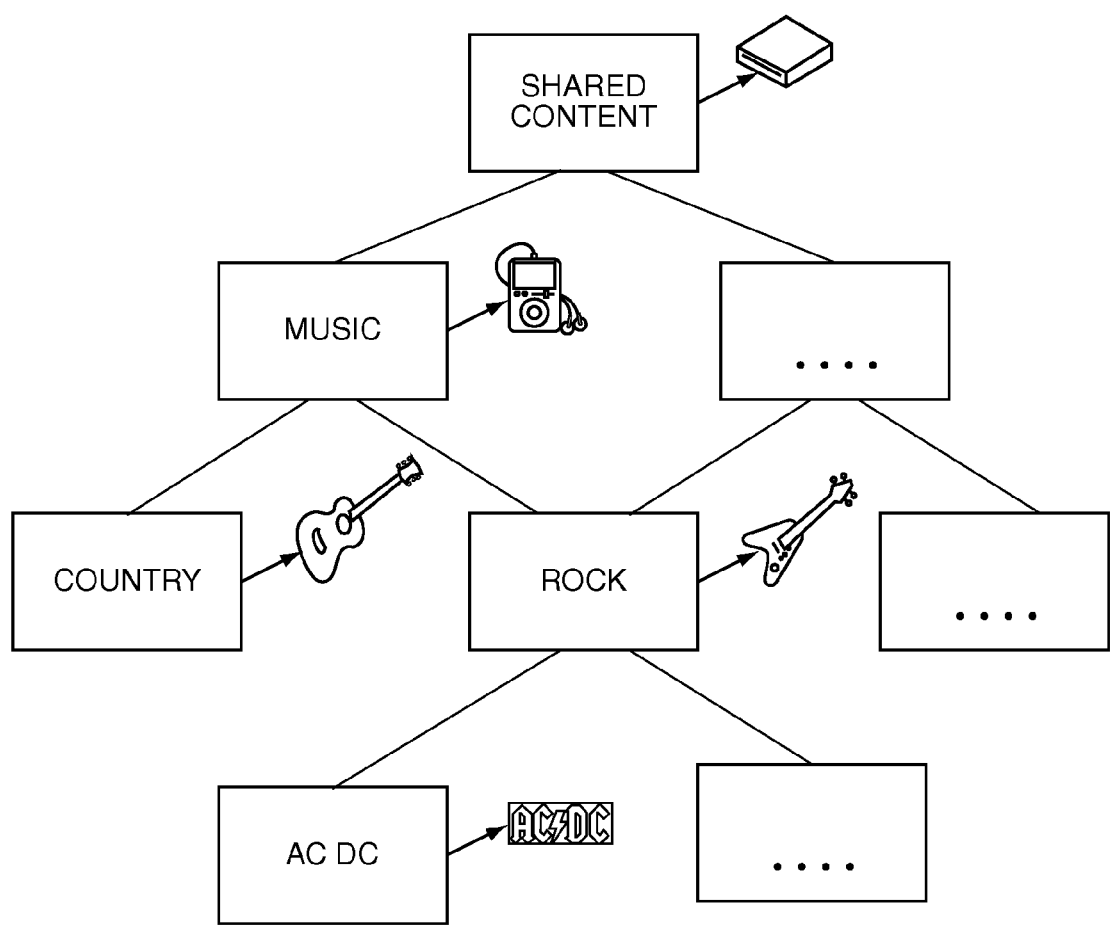
FIG. 5 illustrates an exemplary ontology defining content representations according to one embodiment of the present invention.

Before proceeding, an exemplary ontology providing the defined set of content representations is illustrated in FIG. 5. Note that the exemplary ontology of FIG. 5 is for illustrative purposes and is not intended to limit the scope of the present invention. In this example, the ontology includes a "shared content" node, a "music" node, a "country" node, a "rock" node, an "AC/DC" node, and the like. Each of the nodes has one or more associated content representations that are indicative of the corresponding node in the ontology. Using this ontology, the content metadata for the user 40-1 may be processed to determine which of the content representations are applicable to the content made available by the user 40-1. For example, if the content metadata for the user 40-1 includes metadata for shared music from the Country genre, the rules for the nodes in the ontology may be defined such that the content representations for the "shared content" node, the "music" node, and the "country" node are all applicable to the content made available by the user 40-1. If the content metadata for the user 40-1 also includes metadata for shared music from the Rock genre, the rules for the nodes in the ontology may be defined such that the content representation for the "rock" node is also applicable to the content made available by the user 40-1. In order to determine which ontological nodes are applicable, a scoring scheme may be used such as that disclosed in U.S. patent application Ser. No. 11/359,632, entitled "Methods, Systems, and Products for Characterizing Target Systems," filed Feb. 22, 2006 and U.S. patent application Ser. No. 11/414,021, entitled "Methods, Systems, and Products for Classifying Content Segments," filed Apr. 28, 2006, both of which are hereby incorporated herein by reference in their entireties.

Note that the process of determining which content representations are applicable to the content made available by the user 40-1 may occur in response to the user event or at some previous point in time. For example, the CR engine 60 may determine which content representations are applicable when the content metadata for the content made available by the user 40-1 is first added to the content metadata database 46. The CR engine 60 may then update the content representations periodically or in response to changes in the content metadata.

Returning to FIG. 4A, once the CR engine 60 has identified the applicable content representations, the CR engine 60 may optionally filter the applicable content representations based on, for example, the user preferences of the viewing user 36-1. For example, if the preferred genre of the user 36-1 is Country and the applicable content representations include a country content representation and a rock content representation, the CR engine 60 may filter the applicable content representations such that only the country content representation is selected for the navigation tree of the hosting user 36-1 provided for the viewing user 36-1. The applicable content representations may also be filtered based on whether the viewing user 36-1 is authorized to obtain the corresponding content. Content representations for content that the viewing user 36-1 is not authorized to obtain may be filtered from the applicable content representations. The applicable content representations may also be filtered based on available storage space at the client device 34-1 of the viewing user 36-1. Other filtering criteria will be apparent to one of ordinary skill in the art upon reading this disclosure and are to be considered within the scope of the present invention.

In addition or alternatively, the user preferences may include a navigation preference of the user 36-1. The navigation preference identifies the manner in which the user 36-1 desires to navigate through content representations for other users. For example, the navigation preference may provide that the user 36-1 desires to navigate by genres and sub-genres or other classification schemes, time period of release, acoustic styles, locations, or the like or any combination thereof. As such, if the navigation preference is set to genres and subgenres, the CR engine 60 may filter the applicable content representations to remove content representations for other classification schemes, time periods, acoustic styles, and locations. However, detailed content representations such as those for artists may not be filtered and may be used for low levels or the lowest level of the navigation tree. The user preferences may also include types of relationships that are of interest to the user. For example, the user may be interested in related artists generally, artists related either musically or socially to a particular artist, or the like.

The CR engine 60 then generates the navigation tree from the applicable content representations or, optionally, the filtered applicable content representations. For example, if the applicable content representations are filtered based on the navigation preference of the user 36-1 and the navigation preference is genres and sub-genres, then the CR engine 60 may form a navigation tree having, for example, a content representation indicative of shared audio content as the first level of the navigation tree, content representations indicative of genres as a second level of the navigation tree, optionally content representations indicative of sub-genres as one or more additional levels of the navigation tree, and content representations indicative of artists as a bottom level of the navigation tree.

Once the navigation tree is generated, the CR engine 60 selects one or more of the content representations in the navigation tree to be presented in association with the avatar of the hosting user 40-1 in the view of the virtual environment provided to the viewing user 36-1 (step 208). In one embodiment, the one or more selected content representations are the content representations from one of the levels of the navigation tree. For example, the CR engine 60 may select the one or more content representations using a recommendation engine. The recommendation engine may consider criteria such as the user preferences of the viewing user 36-1, the metadata describing content made accessible by the viewing user 36-1, past activities of the viewing user 36-1, the navigation history of the viewing user 36-1, a play history of the viewing user 36-1, or the like, or any combination thereof.

As another example, the CR engine 60 may select the one or content representations based on a layering scheme such as that disclosed in U.S. patent application Ser. No. 11/678,798, entitled LAYERED VISUALIZATION OF CONTENT REPRESENTATIONS, filed Feb. 26, 2007, which is hereby incorporated herein by reference in its entirety. In general, according to the layering scheme, the CR engine 60 may select the one or more content representations based on a distance between the avatar of the viewing user 36-1 and the avatar of the hosting user 40-1 in the virtual environment. If the two avatars are far apart, the CR engine 60 may select the content representations from the top level or some high level of the navigation tree. If the two avatars are relatively close, the CR engine 60 may select the content representations from a lower level of the navigation tree. Note that others schemes may be used to select the content representations to present to the viewing user 36-1, and the examples given above are not intended to limit the scope of the present invention.

The CR engine 60 then provides the one or more selected content representations or information identifying the one or more selected content representations to the environment generation engine 58 in order to effect presentation of the selected content representations in association with the avatar of the hosting user 40-1 in the view of the virtual environment provided to the viewing user 36-1 (step 210). In response, the environment generation engine 58 generates the view of the virtual environment for the viewing user 36-1 including the avatar of the hosting user 40-1 and the one or more selected content representations, and outputs the view to the client device 34-1 of the viewing user 36-1 (steps 212 and 214). The client view may include objects such as graphics and the like needed to form the client view or metadata or other information describing the objects and the locations of the objects to be presented in the client view.

In this example, the logic server 56 subsequently receives a navigation event from the client device 34-1 (step 216). The navigation event is a user event corresponding to interaction with the content representations presented in association with the avatar of the hosting user 40-1 for purposes of navigating through the navigation tree of the hosting user 40-1. For example, looking briefly at FIG. 1A, the navigation event may be an event generated when the viewing user selects the content representation 14 associated with the hosting user in order to proceed down the navigation tree. In another embodiment, an intelligent agent associated with the viewing user 36-1 may generate events on behalf of the viewing user 36-1 in order to navigate the navigation tree of the hosting user 40-1 without direct interaction by the viewing user 36-1.

Note that in addition to or as an alternative to navigating through the navigation tree by clicking or otherwise selecting content representations, the CR engine 60 may use a layering scheme such as that disclosed in U.S. patent application Ser. No. 11/678,798 to enable the viewing user 36-1 to navigate through the navigation tree by controlling the distance between the avatar of the viewing user 36-1 and the avatar of the hosting user 40-1 in the virtual environment. As such, the navigation event may be a user event related to or changing a distance between the two avatars in the virtual environment.

The logic server 56 provides the navigation event to the CR engine 60 (step 218). Note that the navigation event may alternatively be provided directly to the CR engine 60. In response to the navigation event, the CR engine 60 selects the one or more content representations for the desired level of the navigation tree (step 220). Again looking at FIG. 1A, if the viewing user desires to proceed down to the adjacent level in the navigation tree, the CR engine 60 selects the one or more content representations for the adjacent layer in the navigation tree, which as illustrated in FIG. 1B are a Country content representation 22 and a Rock content representation 20. Note that if the navigation event is the selection of one of two or more content representations, the CR engine 60 selects the one or more content representations in the adjacent layer in the navigation tree that are related to the selected content representation. For example, if the Country content representation 22 and the Rock content representation 20 are presented and the viewing user 36-1 selects the Rock content representation 20, the CR engine 60 then selects the one or more content representations for the adjacent layer in the navigation tree related to or below the Rock content representation 20.

The CR engine 60 then provides the one or more selected content representations or information identifying the one or more selected content representations to the environment generation engine 58 in order to effect presentation of the selected content representations in association with the avatar of the hosting user 40-1 in the view of the virtual environment provided to the viewing user 36-1 (step 222). In response, the environment generation engine 58 generates the view of the virtual environment for the viewing user 36-1 and outputs the view to the client device 34-1 of the viewing user 36-1 (steps 224 and 226). The view provided to the client device 34-1 of the viewing user 36-1 includes the avatar of the hosting user 40-1, the one or more selected content representations, and optionally one or more navigation elements enabling the viewing user 36-1 to proceed back up the navigation tree.

It should be noted that the viewing user 36-1 may dynamically control the configuration of the navigation tree of the hosting user 40-1. More specifically, as discussed above, the applicable content representations that are descriptive of the content made accessible by hosting user 40-1 may be filtered by the CR engine 60 based on the navigation preferences or other user preferences of the viewing user 36-1 during generation of the navigation tree. However, as an example, the viewing user 36-1 may change the navigation preferences while navigating the navigation tree of the hosting user 40-1. In response, the CR engine 60 regenerates the navigation tree based on the new navigation preferences and proceeds accordingly. Also note that if the applicable content representations are filtered during generation of the navigation tree, the viewing user 36-1 may choose to expand the navigation tree to include all of the applicable content representations or to expand a particular branch of the navigation tree to include content representations that were originally filtered or removed from the navigation tree.

In this example, the logic server 56 subsequently receives a content transfer initiation event from the client device 34-1 (step 228). The content transfer initiation event may occur when the viewing user 36-1 selects a content representation representing content of interest. For example, the viewing user 36-1 may drag and drop one of the content representations presented in association with the avatar of the hosting user 40-1 representing content of interest to a content representation presented in association with the avatar of the viewing user 36-1. In response, the logic server 56 provides the content transfer initiation event to the CR engine 60 (step 230). Note that the content transfer initiation event may alternatively be provided directly to the CR engine 60.

While not illustrated, at this point, either the logic server 56 or the CR engine 60 may perform or initiate an authorization process to determine whether the viewing user 36-1 is authorized to obtain content of interest from the hosting user 40-1, to obtain the versions of the content of interest desired by the viewing user 36-1, or the like. If authorization is not originally provided, the viewing user 36-1 may interact with the hosting user 40-1 to request authorization. Similarly, if purchase of the content is required, an e-commerce transaction may be initiated or performed before content transfer, during content transfer, or after content transfer in any manner known in the art.

Once content transfer is initiated, the CR engine 60 identifies one or more content items made accessible by the hosting user 40-1 and represented by the selected content representation(s) to transfer to the client device 34-1 of the viewing user 36-1 (step 232). In one embodiment, the CR engine 60 uses a recommendation engine to identify the content items to transfer to the client device 34-1 of the viewing user 36-1. The recommendation engine may be part of the CR engine 60 or, for example, a separate function of the VE engine 44 (FIG. 3). More specifically, if for example the viewing user 36-1 selects a Country content representation to initiate the content transfer, the CR engine 60, or more specifically the recommendation engine, identifies one or more of the content items made accessible by the hosting user 40-1 from the Country genre that are to be provided to the client device 34-1 of the viewing user 36-1. The recommendation engine may select the content items based the user preferences of the viewing user 36-1 such as preferred genres, sub-genres, time periods, artists, or the like; the content metadata describing the content made accessible by the viewing user 36-1; a navigation history of the viewing user 36-1 including information indicative of genres, sub-genres, artists, time periods, or the like in which the viewing user 36-1 has displayed an interest by navigating to corresponding content representations in the navigation tree of the hosting user 40-1 and/or navigation trees of other hosting users; previous activities of the viewing user 36-1 such as downloading or purchasing of content; a play history of the viewing user 36-1 identifying content previously or recently played by the viewing user 36-1; or the like or any combination thereof. The details of the recommendation engine are not central to the present invention. As will be apparent to one of ordinary skill in the art upon reading this disclosure, any type of recommendation engine that is suitable for the present invention may be used.

Note that while a recommendation engine is discussed herein, a "wish list" may be used in addition to or as an alternative to the recommendation engine. The wish list may identify a number of content items or types of content items of interest to the viewing user 36-1. Based on the wish list, the VE engine 44 may select content items to be transferred to the client device 34-1 of the viewing user 36-1.

Once the content items to transfer to the client device 34-1 of the viewing user 36-1 are identified, the CR engine 60 generates a content transfer plan (step 234). The content transfer plan is generally a list of content items defining an order in which the content items are to be transferred to the client device 34-1. The content transfer plan also includes information needed for the transfer of each content item such as a corresponding file name and location, a version of the content item to obtain, a location on the client device 34-1 where the content item is to be stored, and any security credentials such as a user name and/or password needed to obtain the content. Regarding the security credentials, the viewing user 36-1 may alternatively be prompted to enter the security credentials. The content transfer plan may be stored in an Extensible Markup Language (XML) file or stored in memory. The content items in the content transfer plan may be ordered based on the user preferences of the viewing user 36-1. For example, the user preferences may define whether content items are to be obtained depth-first or breadth-first, where depth-first and breath-first are approaches to traversing content representations or corresponding ontological nodes below the selected content representation or corresponding ontological node. In addition or alternatively, the content items in the content transfer plan may be ordered by the recommendation engine or based on scores or rankings assigned to the content items by the recommendation engine.

Once the content transfer plan is generated, the CR engine 60 interacts with the content sharing function 42 to effect content transfer according to the content transfer plan (step 236). More specifically, in one embodiment, the CR engine 60 provides individual file transfer requests to the content sharing engine 42 according to the content transfer plan via web services or similar technology. Note that content sharing function 42 may allow for batch operations. The content sharing engine 42 may expose an Application Programming Interface (API) that includes operations such as, for example, get file information, start file transfer, pause file transfer, resume file transfer, stop file transfer, get file transfer status, and the like.

Note that the CR engine 60 may obtain or automatically receive feedback, and may use the feedback to generate or restructure the content transfer plan. The feedback may include feedback from the content sharing engine 42 including, for example, locations of the content items in the content transfer plan, capabilities of the device(s) on which the content items are hosted such as bandwidth or connection speed of the device(s), file transfer histories, information indicating whether the content items are currently cached by the content sharing function 42 or associated device, or the like. The feedback may additionally or alternatively include feedback regarding the destination of the transferred content which is preferably the client device 34-1 of the viewing user 36-1. The feedback regarding the destination may include remaining storage space, bandwidth or connection speed, or the like.

In this example, the logic server 56 receives a configuration event during transfer of the content (step 238). The configuration event is some event altering the content transfer or more specifically the content items to be transferred. For example, the configuration event may be an event changing a confidence factor of the recommendation engine to be used when selecting the content items to be transferred. The confidence factor may be adjusted by the viewing user 36-1 to control the amount of content to be transferred. By increasing the confidence factor, the viewing user 36-1 can decrease the amount of content to be transferred. By decreasing the confidence factor, the viewing user 36-1 can increase the amount of content to be transferred. The logic server 56 provides the configuration event to the CR engine 60 (step 240). Note that the configuration event may alternatively be provided directly to the CR engine 60.

In response to the configuration event, the CR engine 60 identifies content items to be transferred to the client device 34-1 of the viewing user 36-1 and updates the content transfer plan in a manner similar to that described above (steps 242 and 244). The CR engine 60 then interacts with the content sharing function 42 to effect transfer of the content to the client device 34-1 of the viewing user 36-1 according to the content transfer plan (step 246).

While not illustrated for clarity and ease of discussion, the CR engine 60 may provide additional or alternative features not discussed above. First, while transfer of content items is discussed above, the present invention is not limited thereto. Rather than transferring the content items, the content transfer may transfer metadata describing content items, playlists, or the like and optionally information enabling subsequent download of the corresponding content items from one or more devices associated with the hosting user 40-1 such as the client device 38-1, from a third-party service such as an e-commerce or subscription based media service, or the like.

Second, the system 28 may enable the viewing user 36-1 to obtain content for other users on a buddy list of the viewing user 36-1. Assuming that the other users are visiting other areas of the virtual environment, the ability of the users to acquire content of interest is greatly expanded. In operation, when exploring the navigation tree of the hosting user 40-1, the viewing user 36-1 may be notified of content matching preferences of one or more of the users in his buddy list. Notification may occur by presenting visual elements or content representations for the other users in association with the avatar of the viewing user 36-1. The viewing user 36-1 may then initiate transfer of content matching the preferences of one of the other users to the client device 34-1 of the viewing user 36-1 or the client device of the other user by, for example, dragging and dropping the content representation of the hosting user 40-1 to the visual element or content representation of the other user. If the content is transferred to the client device 34-1 of the viewing user 36-1, the content may subsequently be transferred to the client device of the other user. Alternatively, the content transfer may be initiated automatically. Again, the content transfer may be the transfer of content items. Alternatively, the content transfer may be the transfer of metadata, playlists, or the like and optionally including information enabling subsequent download of the corresponding content items from one or more devices associated with the hosting user 40-1 such as the client device 38-1, from a third-party service such as an e-commerce or subscription based media service, or the like.

In another embodiment, rather than notifying the viewing user 36-1 of content of interest to one or more of his buddies, the VE engine 44, the client device 34-1, or the viewing user 36-1 may notify the buddies of the content. The buddies may then initiate transfer of the content, metadata describing the content, or the like if desired.

Third, the CR engine 60 may enable the viewing user 36-1 to utilize the perspective of another user. For example, the viewing user 36-1 may choose to view the virtual environment, and particularly the content representations from all hosting users or a particular hosting user, from the perspective of another user such as, for example, the user 36-2. The viewing user 36-1 may choose the perspective of the user 36-2 by, for example, right-clicking on the content representation presented in association with the avatar of the hosting user 40-1 and selecting the user 36-2 from a list of other users. As a result, a corresponding event is provided to the CR engine 60, and the CR engine 60 generates the navigation tree for the hosting user 40-1 based on the user preferences of the user 36-2 rather than the user preferences of the user 36-1. As a result, the navigation tree is formed as if the viewing user 36-1 was in fact the user 36-2. The viewing user 36-1 may then explore the navigation tree of the hosting user 40-1 from the perspective of the user 36-2. As a result, the viewing user 36-1 may be presented with content representations that the viewing user 36-1 would otherwise have not seen.

Fourth, the users 36-1 and 40-1 may be enabled to move their avatars away from one another in the virtual environment during a content transfer. As such, the users 36-1 and 40-1 are free to explore the virtual environment while the content transfer is taking place. In one embodiment, in order to enable continued control of the content transfer, the CR engine 60 may effect presentation of a visual representation of the avatar of the hosting user 40-1 and elements enabling configuration of the content transfer such as those shown in FIG. 1D in the view of the viewing user 36-1 when the avatar of the hosting user 40-1 is no longer in the view of the viewing user 36-1. The representation of the avatar of the hosting user 40-1 may enable the viewing user 36-1 to interact with the hosting user 40-1 for purposes of content sharing just as if the avatar of the hosting user 40-1 were still in the view of the viewing user 36-1. In another embodiment, the CR engine 60 may effect presentation of a path or other visualization enabling the viewing user 36-1 to locate the avatar of the hosting user 40-1 in the virtual environment.

Fifth, the CR engine 60 may interact with the logic server 56 and the environment generation engine 58 to provide a third-party view of interactions with a particular user. More specifically, the CR engine 60 may provide an interaction representation in the view of the virtual environment provided to the viewing user 36-1, where the interaction representation is visually indicative of interactions between the hosting user 40-1 and one or more other users. For example, if numerous other users are interacting with the hosting user 40-1, one or more interaction representations may be presented to provide an indication of the interactions and, optionally, the types of interactions. The interaction representation may indicate whether the other users are currently exploring the navigation tree of content representations for the hosting user 40-1, participating in a content transfer with the hosting user 40-1, participating in a chat session with the hosting user 40-1, or the like.

Sixth, the CR engine 60 may store a current interaction state to allow users to continue an interaction from a point where the interaction was terminated due to, for example, system failures. Thus, for example, if a system failure occurs during a content transfer, the CR engine 60 may store a current interaction state such that the content transfer can resume at a later time. In addition, the CR engine 60 may store an audit trail of all prior interactions, where the audit trail may be inspected by the users to search and report on any interactions that they initiated or in which they participated.

Figure 6:
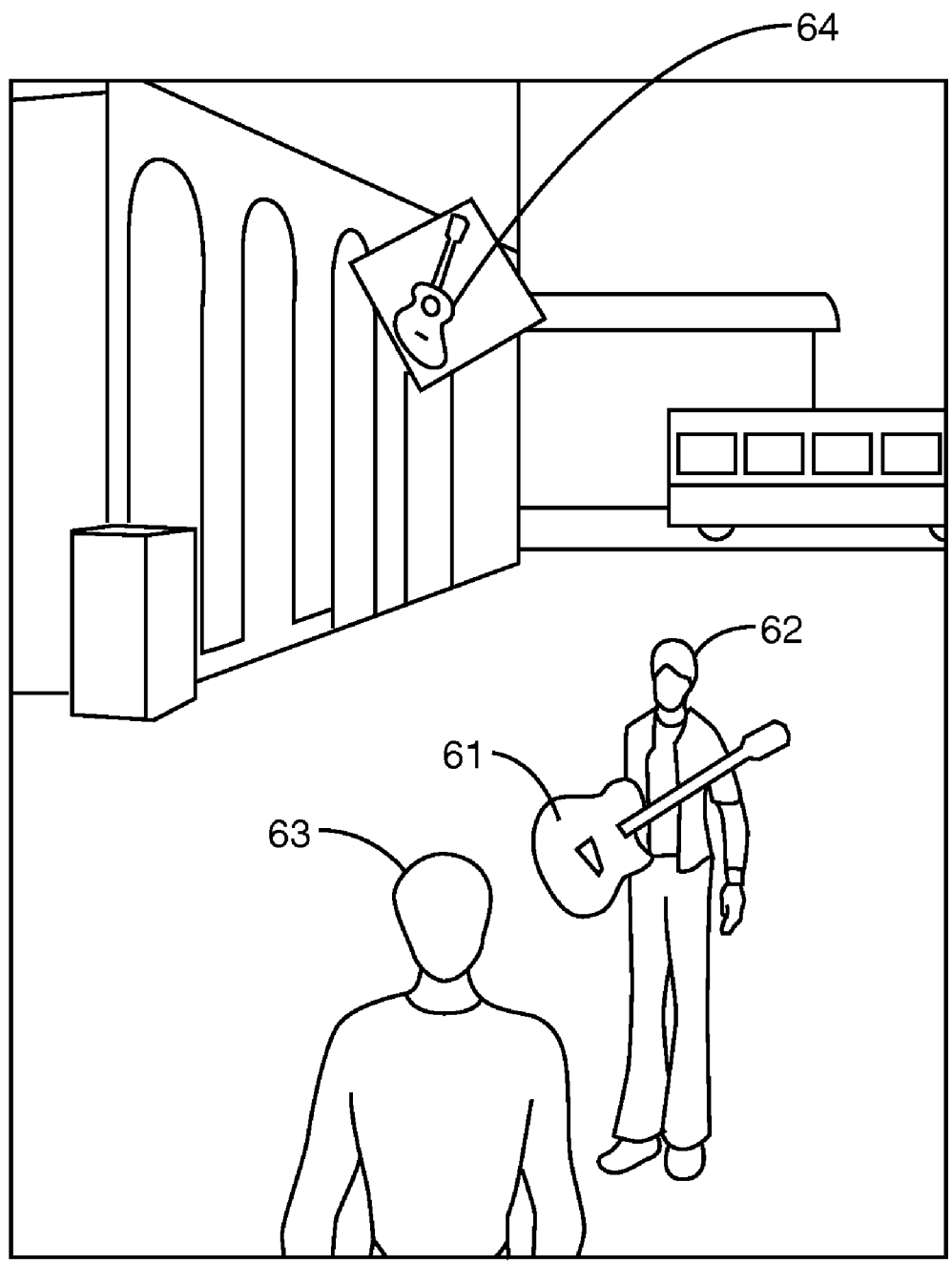
FIG. 6 illustrates a first exemplary client view of a user wherein content representations are associated with avatars representing hosting users in a virtual environment according to one embodiment of the present invention.

FIG. 6 is an exemplary client view of a virtual environment provided to, for example, the user 36-1 according to the present invention. As illustrated, a content representation 61 is presented in association with an avatar 62 of a hosting user, which may be the user 40-1. The content representation 61 is descriptive of the content made accessible by the hosting user 40-1. In this example, the content representation 61 enables the user 36-1, which is represented by an avatar 63, to easily determine that music from the Rock genre is available from the user 40-1 represented by the avatar 62. Further, as discussed above, the viewing user 36-1 may interact with the content representation 61 to further explore the content representations for the hosting user 40-1 and to initiate a content transfer if desired.

In addition, content representations may be presented in association with other virtual objects in the virtual environment such as storefronts or the like. In this example, a content representation 64 is presented in association with a storefront. From the content representation 64, the user 36-1 can easily determine that music from the Country genre is available from, for example, a user represented by an avatar within the store, an owner or operator of the store, or the like. Again, the user 36-1 may interact with the content representation 64 for content exploration and to initiate a content transfer if desired.

Figure 7:
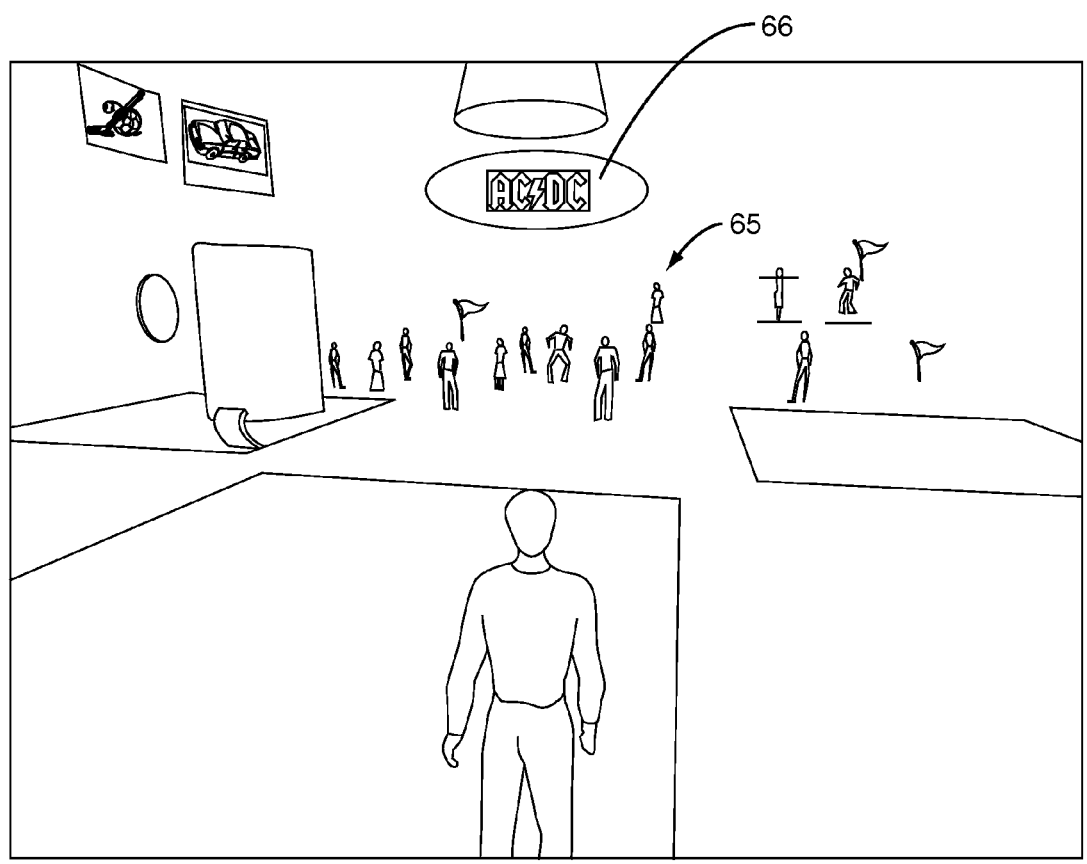
FIG. 7 illustrates a second exemplary client view of a user wherein a content representation is associated with a group of avatars in a virtual environment according to one embodiment of the present invention.

FIG. 7 is another exemplary client view of the user 36-1 that illustrates another function that may be provided by the CR engine 60. In this illustration, a large group of avatars 65 is within the view of the user 36-1. In this situation, it may not be desirable to display a separate content representation for each of the avatars 65. As such, the CR engine 60 may process the content metadata for all of the users represented by the avatars 65 in the group and the user preferences of the user 36-1 to generate a navigation tree having associated content representations for the content made accessible by the users represented by the avatars 65 in the group. The user 36-1 may then interact with the content representation 66 for content exploration according to the navigation tree for the group and to initiate a content transfer if desired.

Figure 8:
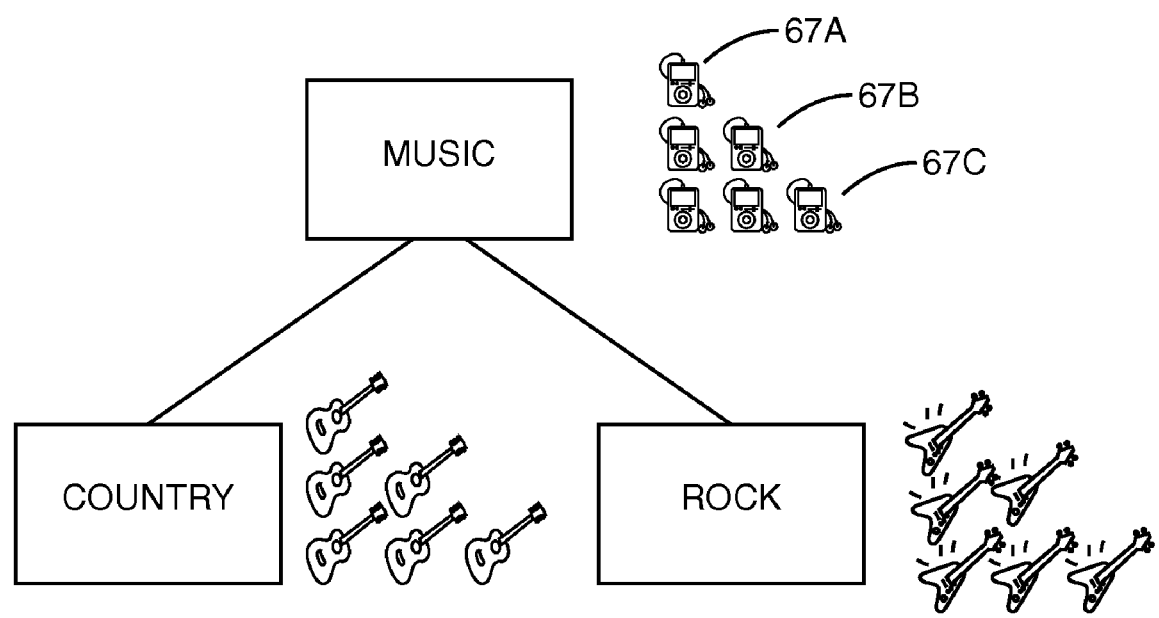
FIG. 8 illustrates an additional feature wherein the content representations are both descriptive of the content as well as the quality of the content according to one embodiment of the present invention.

FIG. 8 illustrates content representations that may be used to indicate quality in addition another content descriptor such as, for example, content type, genre, or the like according to one embodiment of the present invention. In this example, a content representation 67A including a single music player may be used to indicate low quality music content, a content representation 67B including two music players may be used to indicate medium quality music content, and a content representation 67C including three music players may be used to indicate high quality music content. In a similar fashion, content representations defining quality as well as genre may be defined for the "country" and "rock" nodes. As such, the CR engine 60 may also consider content quality when identifying applicable content representations for the content made accessible by a user. In a similar fashion, content representations may be defined to indicate quantity of content, availability or accessibility, DRM or copyright restrictions, or the like.

Figure 9:
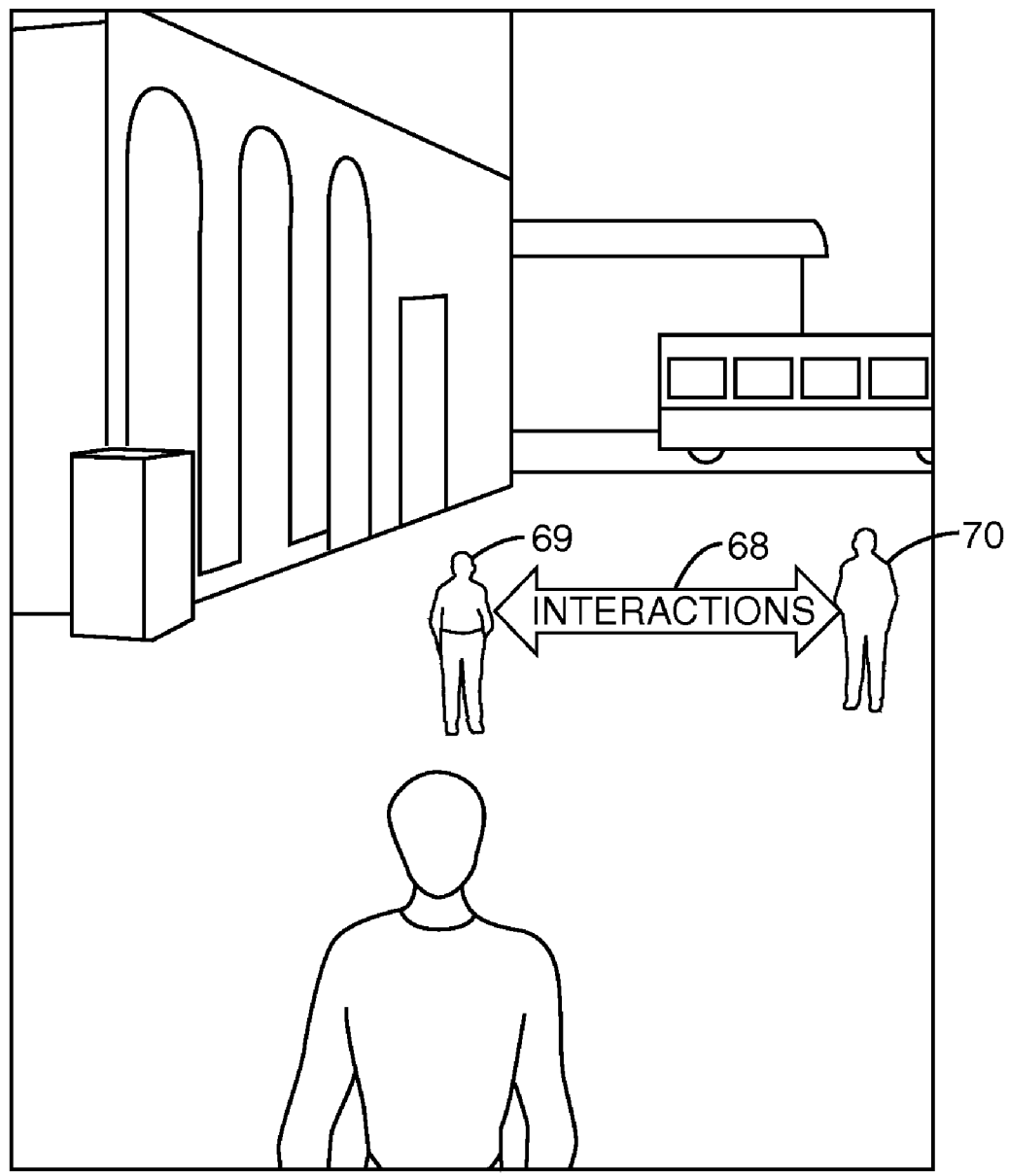
FIG. 9 illustrates an interaction content representation according to one embodiment of the present invention.
Figure 10:
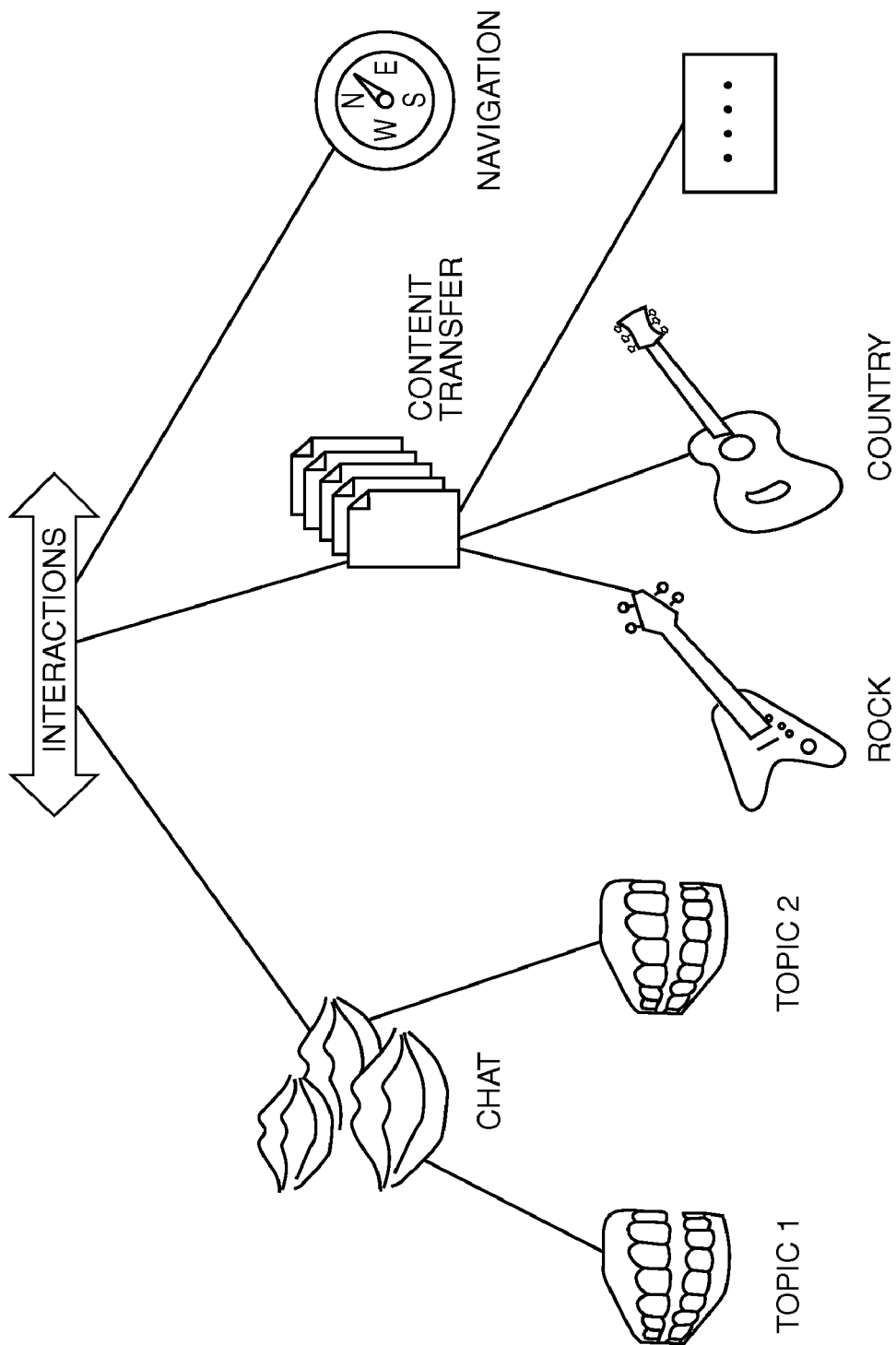
FIG. 10 illustrates a number of exemplary interaction content representations according to one embodiment of the present invention.

FIGS. 9 and 10 illustrate another feature that may be provided by the present invention. Generally, as illustrated in FIG. 9, the VE engine 44 may further operate to provide an interaction or third-party content representation 68 in the client view of the viewing user. The interaction content representation 68 is indicative of current interactions between users represented by avatars 69 and 70. The viewing user may interact with the interaction content representation 68 to navigate through a number of interaction content representations descriptive of interactions between the users represented by the avatars 69 and 70.

FIG. 10 illustrates a number of exemplary interaction content representations. In this example, a chat interaction content representation may be presented when users are participating in a chat session, a content transfer interaction content representation may be presented when the users are participating in a content transfer, and a navigation interaction content representation may be presented when one of the users is navigating the navigation tree of the other user Thus, returning to FIG. 9, the viewing user may interact with the interaction content representation 68 by, for example, double-clicking on the interaction content representation 68. In response, if the users represented by the avatars 69 and 70 are chatting, the VE engine 44 may effect presentation of the chat interaction content representation to the viewing user. The viewing user may then interact with the chat interaction content representation to view one or more interaction content representations that are descriptive of one or more topics of the chat session.

If the users represented by the avatars 69 and 70 are participating in a content transfer, the VE engine 44 may effect presentation of the content transfer interaction content representation to the viewing user. The viewing user may then interact with the content transfer interaction content representation to view one or more content representations descriptive of the content being transferred. Lastly, if, for example, the user represented by the avatar 69 is navigating the navigation tree of the user represented by the avatar 70, the VE engine 44 may effect presentation of the navigation interaction content representation to the viewing user.

FIG. 11 is a block diagram of an exemplary embodiment of the VE server 32-1 according to one embodiment of the present invention. Note that this discussion is equally applicable to the other VE servers 32-2 through 32-N$_1$. In general, the VE server 32-1 includes a control system 71 having associated memory 72. In this example, the VE engine 44, which includes the logic server 56, the environment generation engine 58, and the CR engine 60, is implemented in software and stored in the memory 72. However, the present invention is not limited thereto. The VE server 32-1 also includes one or more digital storage devices 73 such as, for example, one or more hard disc drives, one or more optical storage devices, or the like. The digital storage devices 73 may operate to store the databases 46-54 (FIG. 3). The VE server 32-1 also includes a communication interface 74 communicatively coupling the VE server 32-1 to the central VE server and database 30 and the client devices 34-1 through 34-N$_2$ via one or more networks. The VE server 32-1 may also include a user interface 76, which may include components such as, for example, a display, one or more user input devices, and the like.

FIG. 12 is a block diagram of an exemplary embodiment of the client device 34-1 according to one embodiment of the present invention. Note that this discussion is equally applicable to the other client devices 34-2 through 34-N$_2$ and 38-1 through 38-N$_3$. In general, the client device 34-1 includes a control system 78 having associated memory 80. The memory 80 may store software instructing the client device 34-1 to operate according to the present invention. The client device 34-1 also includes one or more digital storage devices 82 such as, for example, one or more hard disc drives, one or more optical storage devices, or the like. The digital storage devices 82 may operate to store the content shared by or otherwise made accessible by the user 36-1 of the client device 34-1. The client device 34-1 also includes a communication interface 84 communicatively coupling the client device 34-1 to the VE server 32-1 via a network. The client device 34-1 may also include a user interface 86, which may include components such as, for example, a display, one or more user input devices, and the like.

Figure 13:
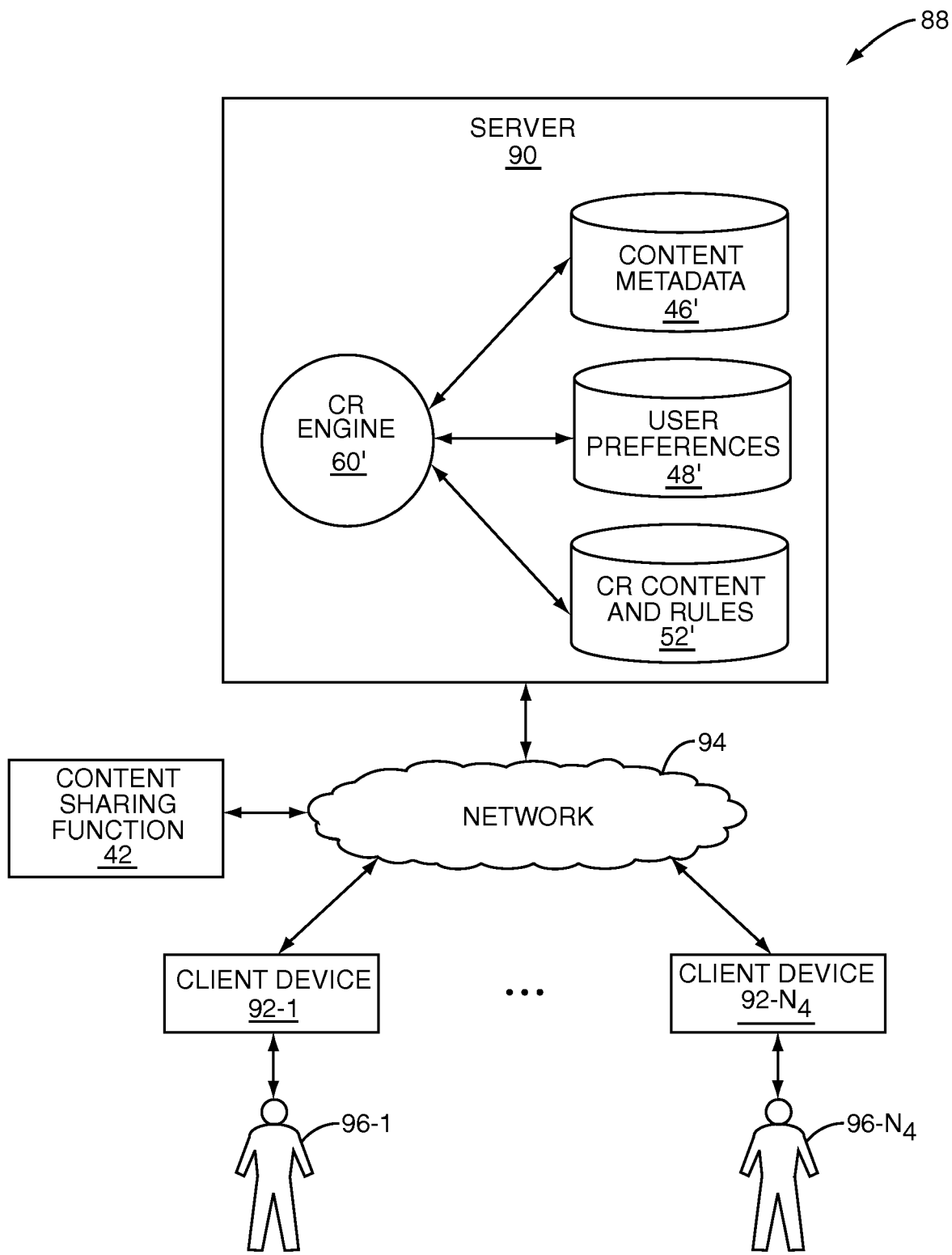
FIG. 13 is system providing content representations and enabling content sharing by interacting with the content representations according to another embodiment the present invention.

While the discussion above focuses on the CR engine 60 with respect to a virtual environment, the present invention is not limited thereto. The CR engine 60 should be viewed as an additive technology that may be implemented in any type of system where it is desirable to have content representations enabling users to easily determine whether content of interest is shared or otherwise made accessible by other users of the system and to enable the users to initiate transfer of content of interest to an associated client device. More specifically, FIG. 13 illustrates a system 88 providing content representations and enabling content sharing according to one embodiment of the present invention. The system 88 may be, for example, a system providing custom webpages for users such those provided by the MYSPACE™ website, a Peer-to-Peer (P2P) content sharing network, a mobile network such as a cellular network or a wireless ad hoc network formed using a local wireless standard such as one of the suite of IEEE 802.11 standards or the BLUETOOTH™ standard, or the like.

In general, the system 88 includes a server 90 and a number of client devices 92-1 through 92-$N_4$ connected by a network 94. The network 94 may be any type of Wide Area Network (WAN), Local Area Network (LAN), or any combination thereof and may include wired components, wireless components, or both wired and wireless components. For example, the network 94 may be the Internet. The client devices 92-1 through 92-$N_4$ have associated users 96-1 through 96-$N_4$. In addition, the system 88 includes a content sharing function 42. The content sharing function 42 may be implemented on a third-party server. Alternatively, the content sharing function 42 may be implemented on the server 90 or implemented on the client devices 92-1 through 92-$N_4$ in a distributed fashion.

The server 90 includes a CR engine 60', a content metadata database 46', a user preferences database 48', and a CR content and rules database 52'. The CR engine 60', the content metadata database 46', the user preferences database 48', and the CR content and rules database 52' are substantially the same as the CR engine 60, the content metadata database 46, the user preferences database 48, and the CR content and rules database 52 discussed above. However, the specific details of each may vary depending on the embodiment of the system 88.

As a first example, the system 88 may be a system providing custom webpages for the users 96-1 through 96-N4, where the webpages are hosted by the server 90. For example, the custom webpages may be similar to those provided by MYSPACE™. The custom webpages operate as content representation hosts. In operation, when the user 96-1 interacts with the client device 92-1 to request the webpage of the user 96-N4 from the server 90, the CR engine 60' operates to identify applicable content representations descriptive of content shared by or otherwise made available by the user 96-N4 and to generate a navigation tree for the user 96-N4 in the manner described above. The CR engine 60' effects presentation of one or more of the content representations from the navigation tree to the user 96-1 in association with the custom webpage of the user 96-N4. The user 96-1 may then interact with the content representations to navigate through the navigation tree for purposes of content exploration and may initiate content transfers if desired.

As a second example, the system 88 may be a P2P content sharing system. In this example, the system 88 is more specifically a hybrid P2P content sharing system wherein server 90 also provides a proxy function acting as an intermediary between the client devices 92-1 through 92-$N_4$ or provides a connection set-up function for establishing direct P2P connections between the client devices 92-1 through 92-$N_4$. It should be noted that, in an alternative embodiment, the client devices 92-1 through 92-$N_4$ may communicate in a true P2P fashion, and the CR engine 60' may be hosted by one of the client devices 92-1 through 92-$N_4$ or distributed among two or more of the client devices 92-1 through 92-$N_4$.

The CR engine 60' may operate to effect presentation of content representations to the user 96-1 as, for example, part of a query response where identifiers of the users or peers in the P2P content sharing network operate as the content representation hosts. More specifically, in response to a query from the client device 92-1, the CR engine 60' may identify the applicable content representations for the user 96-$N_4$ and generate a navigation tree for the user 96-$N_4$. The CR engine 60' then effects presentation of one or more of the content representations from the navigation tree to the user 96-1 in association with an identifier of the user 96-$N_4$ in the query response. The user 96-1 may then interact with the content representations to navigate through the navigation tree for purposes of content exploration and may initiate content transfers if desired.

In addition or alternatively, the user 96-1 may maintain a "buddy list" identifying other users in the system 88, such as the user 96-$N_4$. As such, the CR engine 60' may generate a navigation tree for the user 96-$N_4$ and effect presentation of one or more content representations from the navigation tree in association with an identifier of the user 96-$N_4$ in the buddy list of the user 96-1. The user 96-1 may then interact with the content representations to navigate through the navigation tree for purposes of content exploration and may initiate content transfers if desired.

As a third example, the system 88 may be a mobile network such as a cellular network. The user 96-1 may maintain a "buddy list" identifying other users in the system 88, such as the user 96-$N_4$. As such, using the user 96-$N_4$ as an example, the CR engine 60' may generate a navigation tree for the user 96-$N_4$ and effect presentation of one or more content representations from the navigation tree in association with an identifier of the user 96-$N_4$ in the buddy list of the user 96-1. The user 96-1 may then interact with the content representations to navigate through the navigation tree for purposes of content exploration and may initiate content transfers if desired.

The examples above are intended to illustrate that the present invention is not limited to a virtual environment system as described with respect to FIGS. 1-12, and should not be considered to limit the scope of the present invention. One of ordinary skill in the art will appreciate that the CR engine 60, 60' of the present invention is an additive technology that may be incorporated in any type of system wherein content representations are desirable.

Figure 14:
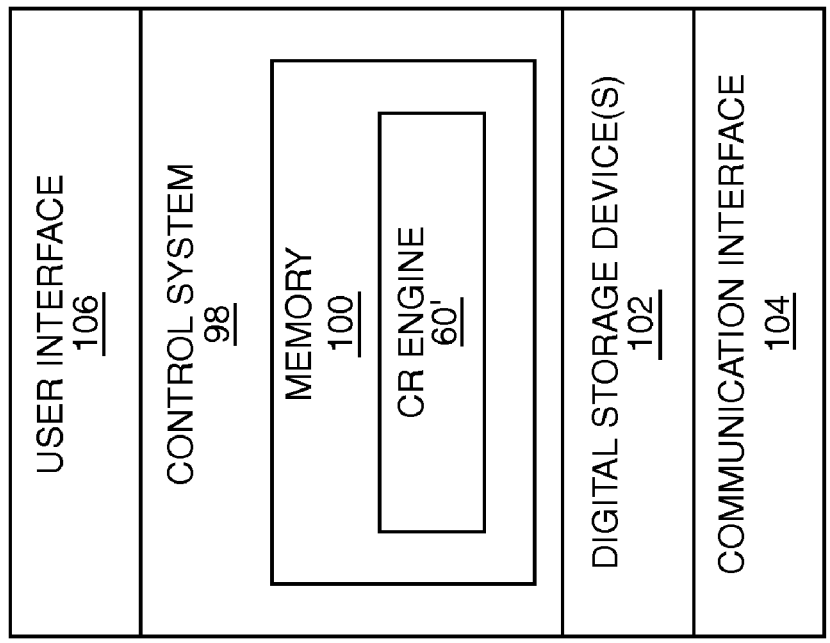
FIG. 14 is a block diagram of an exemplary embodiment of the server of FIG. 13 according to one embodiment of the present invention.

FIG. 14 is a block diagram of an exemplary embodiment of the server 90 of FIG. 13 according to one embodiment of the present invention. In general, the server 90 includes a control system 98 having associated memory 100. In this example, the CR engine 60' is implemented in software and stored in the memory 100. However, the present invention is not limited thereto. The server 90 also includes one or more digital storage devices 102 such as, for example, one or more hard disc drives, one or more optical storage devices, or the like. The digital storage devices 102 may operate to store the content metadata database 46', the user preferences database 48' and the CR content and rules database 52' (FIG. 13). The server 90 also includes a communication interface 104 communicatively coupling the server 90 to the network 94 (FIG. 13). The server 90 may also include a user interface 106, which may include components such as, for example, a display, one or more user input devices, and the like.

Figure 15:
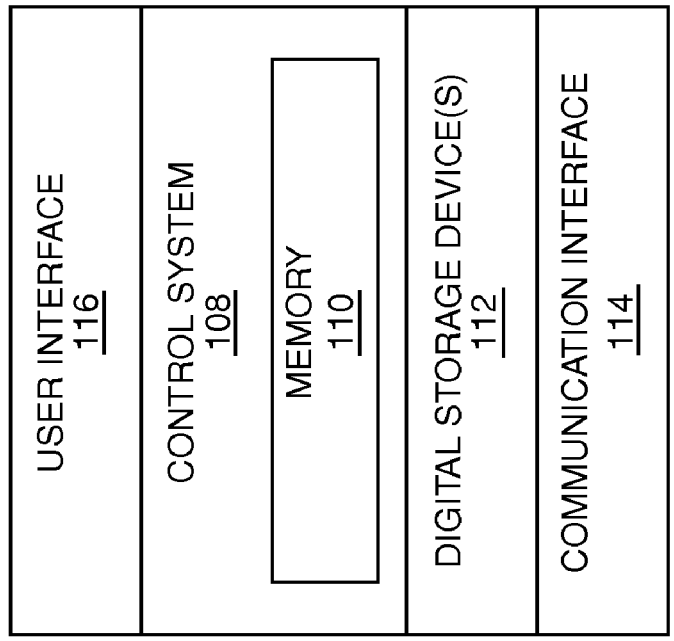
FIG. 15 is a block diagram of an exemplary embodiment of one of the client devices of FIG. 13 according to one embodiment of the present invention.

FIG. 15 is a block diagram of an exemplary embodiment of the client device 92-1 according to one embodiment of the present invention. Note that this discussion is equally applicable to the other client devices 92-2 through 92-N₄. In general, the client device 92-1 includes a control system 108 having associated memory 110. The memory 110 may store software instructing the client device 92-1 to operate according to the present invention. The client device 92-1 also includes one or more digital storage devices 112 such as, for example, one or more hard disc drives, one or more optical storage devices, or the like. The digital storage devices 112 may operate to store the content shared by or otherwise made accessible by the user 96-1 of the client device 92-1. The client device 92-1 also includes a communication interface 114 communicatively coupling the client device 92-1 to the server 90 via the network 94 (FIG. 13). The client device 92-1 may also include a user interface 116, which may include components such as, for example, a display, one or more user input devices, and the like.

Those skilled in the art will recognize improvements and modifications to the preferred embodiments of the present invention. All such improvements and modifications are considered within the scope of the concepts disclosed herein and the claims that follow.

What is claimed is:

1. A method comprising:
    displaying to a viewing user represented with an avatar in a three-dimensional environment a content representation in association with an avatar representing a hosting user at a client device of the viewing user, the content representation descriptive of content made accessible by the hosting user;
    generating a navigation tree in the three-dimensional environment when the viewing user interacts with the content representation, the navigation tree comprising a plurality of content representation layers having content representations descriptive of the content made accessible by the hosting user, wherein each of the plurality of content representation layers has a different content representation displayed to the viewing user based on a distance between the avatar representing the viewing user and the avatar representing the hosting user in the three-dimensional environment;
    enabling the viewing user to navigate through the navigation tree in the three-dimensional environment by interacting with the plurality of content representations;
    displaying in the three-dimensional environment a content representation from the plurality of content representations in association with the avatar representing the hosting user to the viewing user when the viewing user navigates through the navigation tree;
    receiving a content transfer initiation event from the client device of the viewing user for initiating transfer of at least a portion of the content made accessible by the hosting user related to the content representation to the client device of the viewing user when the viewing user selects the content representation; and
    in response to the content transfer initiation event, effecting transfer of the at least a portion of the content made accessible by the hosting user related to the content representation from the avatar representing the hosting to user to the avatar representing the viewing user within the three-dimensional environment.

2. The method of claim 1 wherein enabling the viewing user to navigate through the navigation tree comprises:
    receiving a navigation event from the client device of the viewing user for navigating from the content representation in the navigation tree to at least one related content representation from the plurality of content representations in an adjacent layer of the navigation tree;
    identifying the at least one related content representation in the adjacent layer of the navigation tree; and
    effecting presentation of the at least one related content representation in the adjacent layer of the navigation tree in association with the avatar representing the hosting user to the viewing user at the client device of the viewing user.

3. The method of claim 1 wherein the navigation tree comprises a first level comprising a first one of the plurality of content representations and a second level comprising second ones of the plurality of content representations related to the first one of the plurality of content representations.

4. The method of claim 3 wherein the navigation tree further comprises at least one additional level, each of the at least one additional level comprising additional ones of the plurality of content representations, wherein each of the additional ones of the plurality of content representations is related to at least one content representation from an adjacent level of the navigation tree.

5. The method of claim 1 wherein generating the navigation tree comprises:
    identifying a plurality of applicable content representations that are descriptive of the content made accessible by the hosting user from a defined set of content representations, the plurality of applicable content representations comprising the plurality of content representations; and
    generating the navigation tree comprising the plurality of content representations from the plurality of applicable content representations.

6. The method of claim 5 wherein generating the navigation tree from the plurality of applicable content representations comprises generating the navigation tree from the plurality of applicable content representations based on a navigation preference of the viewing user, the navigation preference defining a manner in which the viewing user desires to navigate through content representations describing the content made accessible by the hosting user.

7. The method of claim 5 wherein generating the navigation tree from the plurality of applicable content representations comprises:
    filtering the plurality of applicable content representations based on user preferences of the viewing user to provide the plurality of content representations; and
    generating the navigation tree from the plurality of content representations.

8. The method of claim 7 wherein the user preferences comprise at least one preference from a group consisting of: at least one preferred music genre of the viewing user, at least one preferred movie genre of the viewing user, at least one preferred television program genre of the viewing user, at least one preferred time period of the viewing user, at least one preferred music artist of the viewing user, at least one preferred actor or actress of the viewing user, and at least one preferred acoustic style of the viewing user.

9. The method of claim 8 wherein the user preferences further comprise a navigation preference of the viewing user defining a manner in which the viewing user desires to navigate through the plurality of content representations describing the content made accessible by the hosting user.

10. The method of claim 7 further comprising enabling the viewing user to expand the navigation tree to include additional ones of the plurality of applicable content representation in addition to the plurality of content representations.

11. The method of claim 5 wherein generating the navigation tree from the plurality of applicable content representations comprises:

filtering the plurality of applicable content representations based on user preferences of a third user selected by the viewing user to provide the plurality of content representations; and generating the navigation tree from the plurality of content representations.

12. The method of claim 11 wherein the user preferences comprise at least one preference from a group consisting of at least one preferred music genre of the third user, at least one preferred movie genre of the third user, at least one preferred television program genre of the third user, at least one preferred time period of the third user, at least one preferred music artist of the third user, at least one preferred actor or actress of the third user, and at least one preferred acoustic style of the third user.

13. The method of claim 12 wherein the user preferences further comprise a navigation preference of the third user defining a manner in which the third user desires to navigate through content representations describing the content made accessible by the hosting user.

14. The method of claim 1 further comprising enabling the viewing user to initiate the transfer of content related to a select one of the plurality of content representations while navigating through the navigation tree.

15. The method of claim 1 further comprising authorizing the transfer of the at least a portion of the content made accessible by the hosting user related to the select one of the plurality of content representations to the client device of the viewing user.

16. The method of claim 1 wherein effecting transfer of the at least a portion of the content made accessible by the hosting user related to the select one of the plurality of content representations comprises:

identifying a plurality of content items from the content made accessible by the hosting user related to the select one of the plurality of content representations to transfer to the client device of the viewing user; and effecting transfer of the plurality of content items to the client device of the viewing user.

17. The method of claim 16 wherein identifying the plurality of content items comprises identifying the plurality of content items using a recommendation engine.

18. The method of claim 16 wherein effecting transfer of the plurality of content items comprises:

generating a content transfer plan, the content transfer plan comprising information that identifies the plurality of content items and defines an order in which the plurality of content items are to be transferred to the client device of the viewing user; and effecting transfer of the plurality of content items to the client device of the viewing user according to the content transfer plan.

19. The method of claim 18 further comprising:

receiving an event from the client device of the viewing user that requires reconfiguration of the content transfer plan; and reconfiguring the content transfer plan in response to the event to provide an updated content transfer plan.

20. The method of claim 1 wherein, in response to the content transfer initiation event, effecting transfer of metadata describing at least a portion of the content made accessible by the hosting user related to the select one of the plurality of content representations to the client device of the viewing user.

21. The method of claim 20 wherein the metadata further comprises information enabling subsequent download of the at least a portion of the content made accessible by the hosting user related to the select one of the plurality of content representations.

22. The method of claim 1 wherein, in response to the content transfer initiation event, effecting transfer of at least one playlist identifying at least a portion of the content made accessible by the hosting user related to the select one of the plurality of content representations to the client device of the viewing user.

23. The method of claim 22 wherein the at least one playlist further comprises information enabling subsequent download of the at least a portion of the content made accessible by the hosting user related to the select one of the plurality of content representations.

24. A hardware server comprising:

a communication interface communicatively coupling the server to a first client device associated with a viewing user and a second client device associated with a hosting user; and a control system associated with the communication interface and adapted to:

display to a viewing user represented with an avatar in a three-dimensional environment a content representation in association with an avatar representing a hosting user at a client device of the viewing user, the content representation descriptive of content made accessible by the hosting user;

generate a navigation tree in the three-dimensional environment when the viewing user interacts with the content representation, the navigation tree comprising a plurality of content representation layers having content representations descriptive of the content made accessible by the hosting user, wherein each of the plurality of content representation layers has a different content representation displayed to the viewing user based on a distance between the avatar representing the viewing user and the avatar representing the hosting user in the three-dimensional environment;

enable the viewing user to navigate through the navigation tree in the three-dimensional environment by interacting with the plurality of content representations;

display in the three-dimensional environment of a content representation from the plurality of content representations in association with host the avatar representing the hosting user to the viewing user when the user navigates through the navigation tree;

receive a content transfer initiation event from the client device of the viewing user for initiating transfer of at least a portion of the content made accessible by the hosting user related to the content representation to the client device of the viewing user when the user selects the content representation; and in response to the content transfer initiation event, effect transfer of the at least a portion of the content made accessible by the hosting user related to the content representation from the avatar representing the hosting to user to the avatar representing the viewing user within the three-dimensional environment.

* * * * *